United States Patent
Koseki et al.

(10) Patent No.: US 9,884,248 B2
(45) Date of Patent: Feb. 6, 2018

(54) DISPLAY CONTROL METHOD FOR HEAD-MOUNTED DISPLAY (HMD) AND IMAGE GENERATION DEVICE

(71) Applicant: BANDAI NAMCO Entertainment Inc., Tokyo (JP)

(72) Inventors: Kazumasa Koseki, Yokohama (JP); Akio Onda, Warabi (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 159 days.

(21) Appl. No.: 14/663,984

(22) Filed: Mar. 20, 2015

(65) Prior Publication Data
US 2015/0352437 A1    Dec. 10, 2015

(30) Foreign Application Priority Data
Jun. 9, 2014    (JP) .................. 2014-119124

(51) Int. Cl.
| | |
|---|---|
| A63F 9/24 | (2006.01) |
| A63F 13/212 | (2014.01) |
| A63F 13/213 | (2014.01) |
| A63F 13/25 | (2014.01) |
| A63F 13/5255 | (2014.01) |
| A63F 13/211 | (2014.01) |
| A63F 13/533 | (2014.01) |
| A63F 13/285 | (2014.01) |

(52) U.S. Cl.
CPC .......... *A63F 13/212* (2014.09); *A63F 13/213* (2014.09); *A63F 13/25* (2014.09); *A63F 13/5255* (2014.09); *A63F 13/211* (2014.09); *A63F 13/285* (2014.09); *A63F 13/533* (2014.09)

(58) Field of Classification Search
CPC ...... A63F 13/213; A63F 13/211; A63F 13/00; A63F 2300/8082; A63F 13/212
See application file for complete search history.

(56) References Cited

U.S. PATENT DOCUMENTS

| | | | | |
|---|---|---|---|---|
| 5,900,849 | A | * | 5/1999 | Gallery .................. G06F 3/011 273/148 B |
| 2007/0132785 | A1 | * | 6/2007 | Ebersole, Jr. ........... A63F 13/06 345/633 |
| 2012/0068913 | A1 | * | 3/2012 | Bar-Zeev ............. G02B 26/026 345/8 |
| 2012/0242865 | A1 | * | 9/2012 | Vartanian ........... H04N 5/23206 348/239 |
| 2013/0041648 | A1 | * | 2/2013 | Osman .................... H04S 7/302 704/2 |

(Continued)

FOREIGN PATENT DOCUMENTS

| | | |
|---|---|---|
| JP | H05-305181 | 11/1993 |
| JP | 2000-210468 A | 8/2000 |
| JP | 2003-125313 A | 4/2003 |

*Primary Examiner* — Steve Rowland
(74) *Attorney, Agent, or Firm* — Oliff PLC

(57) ABSTRACT

The position and the posture of an HMD, and the position of a game controller in the real space are detected, and tracked. An image of a virtual space is displayed on the HMD. A controller object is disposed and displayed at a position within the virtual space that corresponds to the position of the game controller in the real space viewed from the HMD. Therefore, the player can easily find and hold the game controller even when the player wears the HMD.

13 Claims, 17 Drawing Sheets

(56) References Cited

U.S. PATENT DOCUMENTS

| | | | | |
|---|---|---|---|---|
| 2013/0083003 A1* | 4/2013 | Perez | ............ | G06F 3/005 |
| | | | | 345/419 |
| 2013/0222308 A1* | 8/2013 | Ma | ............ | G09G 5/10 |
| | | | | 345/173 |
| 2013/0328762 A1* | 12/2013 | McCulloch | ............ | G02B 27/017 |
| | | | | 345/156 |
| 2013/0328927 A1* | 12/2013 | Mount | ............ | G06T 19/006 |
| | | | | 345/633 |
| 2014/0049558 A1* | 2/2014 | Krauss | ............ | G06F 3/011 |
| | | | | 345/633 |
| 2014/0361977 A1* | 12/2014 | Stafford | ............ | G02B 27/0093 |
| | | | | 345/156 |

* cited by examiner

DISPLAY CONTROL METHOD FOR HEAD-MOUNTED DISPLAY (HMD) AND IMAGE GENERATION DEVICE

Japanese Patent Application No. 2014-119124 filed on Jun. 9, 2014, is hereby incorporated by reference in its entirety.

BACKGROUND

A head-mounted display (HMD) has been known as a key device that provides the user with a vivid and powerful visual experience. For example, a technique that employs the HMD for an attraction in an amusement park, a video game, or the like has been known (see JP-A-5-305181, JP-A-2000-210468, and JP-A-2003-125313, for example).

When playing a game using the HMD as a display device, the player wears the HMD with both hands before starting the game. Specifically, the player wears the HMD without holding the game controller. The player holds the game controller after wearing the HMD. However, it may be difficult for the player to visually determine the position of the game controller in a state in which the player wears the HMD. When the HMD is a non-see-through HMD, the player must grope for the game controller since the player cannot observe the state of the external world.

The player may easily lose the sense of distance and the sense of direction (i.e., become unable to determine the position of the game controller) while the player is checking the state of the HMD worn on the head by moving (tilting) the head, for example. In particular, young people show such a tendency. This type of inconvenience also occurs when the player has temporarily put aside the game controller during the game, for example.

SUMMARY

According to one aspect of the invention, there is provided a method that causes a computer to control a display on a head-mounted display (HMD) that is worn on a head of a user, the method comprising:

causing the computer to receive data that represents a captured image from an imaging section, the imaging section being provided so as to capture a real space that includes the HMD, and a controller that is held and operated by the user;

causing the computer to calculate a virtual position of the controller within a virtual space using the captured image, the virtual space being a display image space of the HMD; and causing the computer to display a first guide display on the HMD using the virtual position, the first guide display indicating a position within the virtual space that corresponds to a position of the controller within the real space.

According to another aspect of the invention, there is provided an image generation device that generates an image that is displayed on a head-mounted display (HMD) that is worn on a head of a user, the image generation device comprising:

a captured image-receiving section that receives data that represents a captured image from an imaging section, the imaging section being provided so as to capture a real space that includes the HMD, and a controller that is held and operated by the user;

a controller position calculation section that calculates a virtual position of the controller within a virtual space using the captured image, the virtual space being a display image space of the HMD; and a first guide display control section that displays a first guide display on the HMD using the virtual position, the first guide display indicating a position within the virtual space that corresponds to a position of the controller within the real space.

DESCRIPTION OF EXEMPLARY EMBODIMENTS

Figure 1:
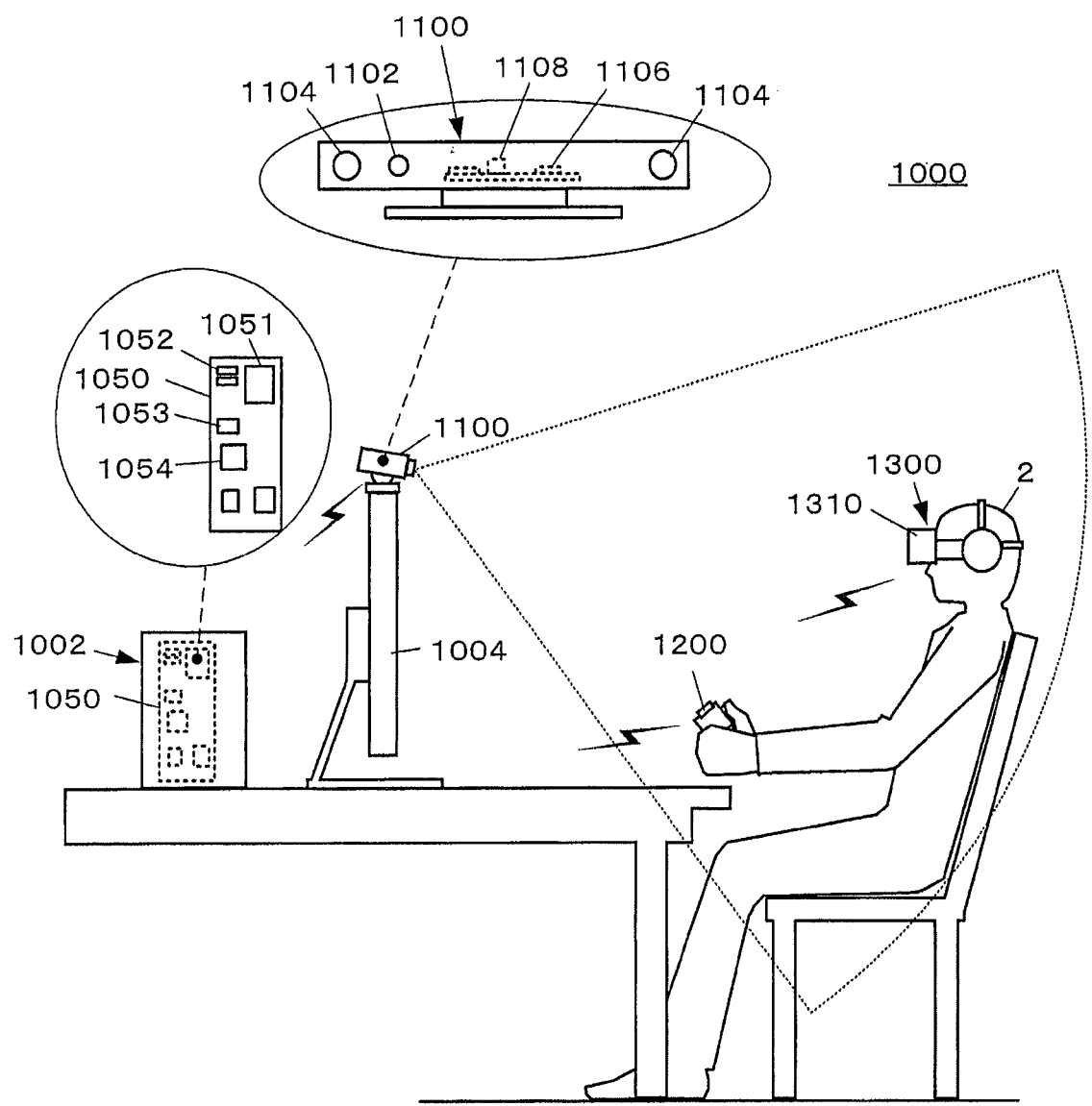
FIG. 1 is a view illustrating a configuration example of a game system.

Several embodiments of the invention may make it possible to improve usability when the user who wears an HMD holds and operates a controller.

According to one embodiment of the invention, there is provided a method that causes a computer to control a display on a head-mounted display (HMD) that is worn on a head of a user, the method comprising:

causing the computer to receive data that represents a captured image from an imaging section, the imaging section being provided so as to capture a real space that includes the HMD, and a controller that is held and operated by the user;

causing the computer to calculate a virtual position of the controller within a virtual space using the captured image, the virtual space being a display image space of the HMD; and causing the computer to display a first guide display on the HMD using the virtual position, the first guide display indicating a position within the virtual space that corresponds to a position of the controller within the real space.

According to another embodiment of the invention, there is provided an image generation device that generates an image that is displayed on a head-mounted display (HMD) that is worn on a head of a user, the image generation device comprising:

a captured image-receiving section that receives data that represents a captured image from an imaging section, the imaging section being provided so as to capture a real space that includes the HMD, and a controller that is held and operated by the user;

a controller position calculation section that calculates a virtual position of the controller within a virtual space using the captured image, the virtual space being a display image space of the HMD; and a first guide display control section that displays a first guide display on the HMD using the virtual position, the first guide display indicating a position within the virtual space that corresponds to a position of the controller within the real space.

This makes it possible to display the first guide display that indicates the position of the controller in the real space within the display screen of the HMD. Since the guide that guides the user to hold the controller is displayed, it is possible to prevent a situation in which the user must grope for the controller even when the player wears the HMD.

The method may further comprise:
causing the computer to calculate a virtual position of the HMD within the virtual space using the captured image; and causing the computer to display the first guide display on the HMD so that the first guide display indicates the virtual position of the controller viewed from the virtual position of the HMD.

This makes it possible to display the first guide display to indicate the position of the controller viewed from viewpoint of the user who wears the HMD. Since the user can visually and clearly determine the position of the controller, the user can more easily find and hold the controller.

The method may further comprise:
causing the computer to determine a position and/or a posture of the HMD in the real space;

causing the computer to generate an image of the virtual space that is displayed on the HMD, the image of the virtual space that is displayed on the HMD changing in field of view corresponding to the determined position and/or the determined posture of the HMD; and causing the computer to change a state of the first guide display corresponding to whether or not the virtual position of the controller is within the field of view.

Since the image that changes in field of view due to a change in the viewpoint position or the line-of-sight direction of the user can be displayed on the HMD, and the first guide display can be displayed within the display image, the user can more easily find and hold the controller.

Moreover, the display state can be changed corresponding to whether or not the controller is situated within the field of view. Therefore, the user can immediately determine whether the controller is situated within the display range (within the field of view) or situated outside the display range (within the field of view) by observing the display state. For example, since the display state is changed corresponding to whether or not the controller is situated within the field of view when the user has turned his/her head, it is possible to allow the user to easily determine the direction in which the controller is present, and provide effective assistance for the user to find and hold the controller.

In the method,
a marker may be provided to the HMD,
the method may further comprise:
causing the computer to determine the position and/or the posture of the HMD using imaging information about the marker within the captured image.

In the method,
the HMD may include a posture detection sensor that includes at least one of an acceleration sensor, a gyro sensor, and a camera for capturing a stationary marker that is provided at a given position within the real space,
the method may further comprise:
causing the computer to determine the position and/or the posture of the HMD using detection results of the posture detection sensor.

The method may further comprise:
causing the computer to perform image processing that displays the first guide display when the first guide display is situated at a hidden position within the virtual space when viewed from the virtual position of the HMD.

This makes it possible to improve the visibility of the first guide display, and allow the user to easily find and hold the controller.

The method may further comprise:
causing the computer to display an object that represents the controller as the first guide display when the virtual position of the controller is within the field of view.

Since the object that represents the controller is displayed within the field of view of the player, it is possible to further improve the visibility of the first guide display.

The method may further comprise:
causing the computer to display an object that represents a direction from the virtual position of the HMD toward the virtual position of the controller as the first guide display when the virtual position of the controller is outside the field of view.

This makes it possible to clearly indicate that the controller is not situated within the field of view, and indicate the direction in which the controller is situated. Therefore, the user can easily find the controller.

The method may further comprise:
causing the computer to calculate a virtual position of a hand of the user within the virtual space that corresponds to the real space using the captured image; and causing the computer to display a second guide display on the HMD using the virtual position of the hand, the second guide display indicating a position within the virtual space that corresponds to a position of the hand within the real space.

According to this configuration, the second guide display that indicates the position of the hand of the user is displayed within the image displayed on the HMD. Since the user can easily determine the direction and the degree of stretch required to reach the controller from the positional relationship between the first guide display that indicates the position of the controller and the second guide display that indicates the position of the hand of the user, even young people can easily find and hold the controller.

The method may further comprise:
causing the computer to calculate a virtual position of a hand of the user within the virtual space that corresponds to the real space using the captured image; and
causing the computer to change the first guide display using a relative positional relationship between the virtual position of the controller and the virtual position of the hand.

This makes it possible for the user to determine the positional relationship between the controller and the hand from the first guide display. For example, the display color of the first guide display may be changed, the first guide display may be blinked, or the direction of the first guide display may be changed corresponding to the distance. Therefore, the user can more easily determine the direction and the degree of stretch required to reach the controller.

The method may further comprise:
causing the computer to detect whether or not the controller is held; and
causing the computer to display the first guide display when the controller is not held.

Since a situation in which the user must find the controller can be automatically detected, and the first guide display can be displayed, it is possible to improve usability.

The method may further comprise:
causing the computer to output a guide sound from a headphone that is worn by the user, the guide sound representing the virtual position of the controller.

This makes it possible to indicate the position of the controller using sound. Since the user is guided using an image and sound, the user can more easily find the controller.

The method may further comprise:
causing the computer to initialize a coordinate system of the virtual space so as to correspond to the real space.

This makes it possible to initialize the coordinate system of the virtual space so as to correspond to the real space.

In the method,
a camera may be provided to the HMD,
the method may further comprise:
causing the computer to detect whether or not the controller is captured within an image captured by the camera; and
causing the computer to perform a given notification control process corresponding to a detection result as to whether or not the controller is captured within the image captured by the camera.

This makes it possible for the user to more easily find the controller.

Exemplary embodiments to which the invention is applied are described in detail below. Note that the following exemplary embodiments do not in any way limit the scope of the invention defined by the claims laid out herein. Note also that all of the elements described in connection with the following exemplary embodiments should not necessarily be taken as essential elements of the invention.

FIG. 1 is a view illustrating an example of the configuration of a game system according to one embodiment of the invention.

A game system 1000 according to one embodiment of the invention includes a game device main body 1002, a touch panel 1004, a range sensor unit 1100, a game controller 1200, and a headset 1300 that is provided with an HMD 1310. The HMD 1310 is a non-see-through (immersive) HMD. Note that the HMD 1310 may be a semi-see-through or see-through HMD.

The game device main body 1002 is one type of computer, and includes a control board 1050.

The control board 1050 includes 1) a microprocessor (e.g., central processing unit (CPU) 1051, graphics processing unit (GPU), and digital signal processor (DSP)), 2) an IC memory 1052 (e.g., VRAM, RAM, and ROM), 3) a communication module 1053 for communicating with a peripheral device (e.g., touch panel 1004, range sensor unit 1100, game controller 1200, and headset 1300) through wireless or cable communication, and 4) a driver circuit 1054 that drives the touch panel 1004 and the like, for example.

Note that the part or the entirety of the control board 1050 may be implemented by an application-specific integrated circuit (ASIC) or a field-programmable gate array (FPGA).

The game device main body 1002 reads a program and data stored in the IC memory 1052 using the control board 1050, and performs a calculation process to control the game system 1000 so that the game system 1000 executes a video game.

The touch panel 1004 is a video monitor hat includes a touch panel, and is situated approximately in front of a player 2.

The range sensor unit 1100 is secured on the upper part of the touch panel 1004 so that the range sensor unit 1100 faces in the front direction of the display screen of the monitor, and the headset 1300 and the game controller 1200 are included within the capture range, for example. The range sensor unit 1100 captures an image of the player 2 positioned in front of the touch panel 1004, and an object situated around the player 2, and outputs the resulting image data to the game device main body 1002. The range sensor unit 1100 analyzes the image to calculate the distance to the player 2 and the object situated around the player 2, and outputs distance information to the game device main body 1002. Note that FIG. 1 includes a front view illustrating the range sensor unit 1100.

The range sensor unit 1100 includes an infrared irradiator 1102 that applies infrared rays (IR) forward, a color image sensor 1104 that can capture an image (reflected infrared image) of the reflected infrared rays from the object situated in front of the range sensor unit 1100, and one or a plurality of LSI 1106 that analyze the reflected infrared image to calculate the relative distance to the object, and perform an image recognition process, for example. The color image sensor 1104 is one type of imaging means.

The range sensor unit 1100 recognizes the game controller 1200, the headset 1300, and each part of the body of the player 2 from the image captured by the color image sensor 1104, and determines a representative point within the captured image. The range sensor unit 1100 then determines the distance to the representative point. The ranging process may be implemented by utilizing known IR range sensor technology.

Note that the ranging technology employed for the range sensor unit 1100 is not limited to IR ranging technology. Appropriate ranging technology may be used. For example, a stereo image may be captured using a right color image sensor 1104 and a left color image sensor 1104, and the distance may be calculated from the parallax.

The range sensor unit 1100 includes a known 6-axis sensor 1108.

The 6-axis sensor 1108 is a known motion trace sensor that detects movements in the longitudinal direction (i.e., the direction of the optical axis of the color image sensor 1104), the lateral direction, and the vertical direction (triaxial directions) of the range sensor unit 1100, and the rotation around each axis. For example, the 6-axis sensor 1108 detects accelerations in the triaxial directions, and angular velocities around the three axes. The 6-axis sensor 1108 may detect accelerations in the triaxial directions, and geomagnetic directions (north, south, east, and west). The orientation of the depth axis (Z-axis) of the coordinate system of the ranging space can be determined from the detection results of the 6-axis sensor 1108.

The range sensor unit 1100 appropriately includes a communication module for communicating with the game device main body 1002, a battery, and the like.

Figure 2A:
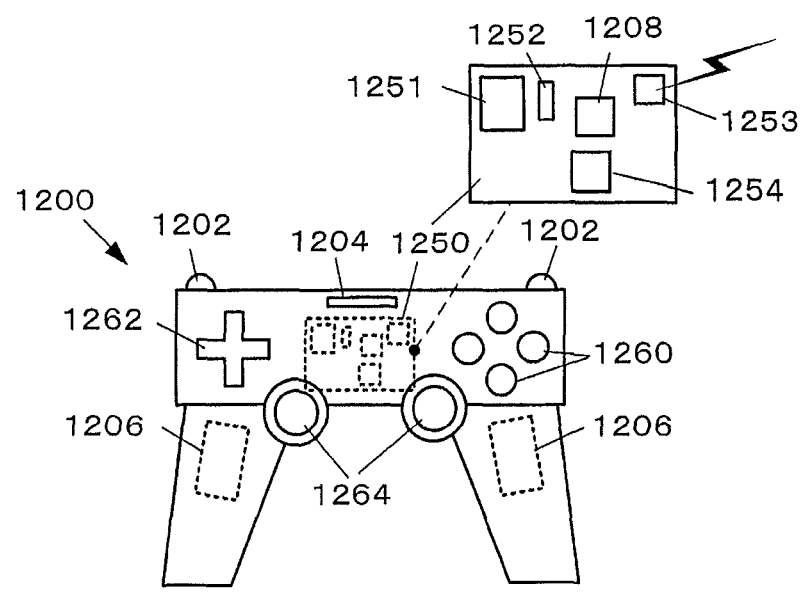
FIG. 2A is a view illustrating a configuration example of a game controller.
Figure 2B:
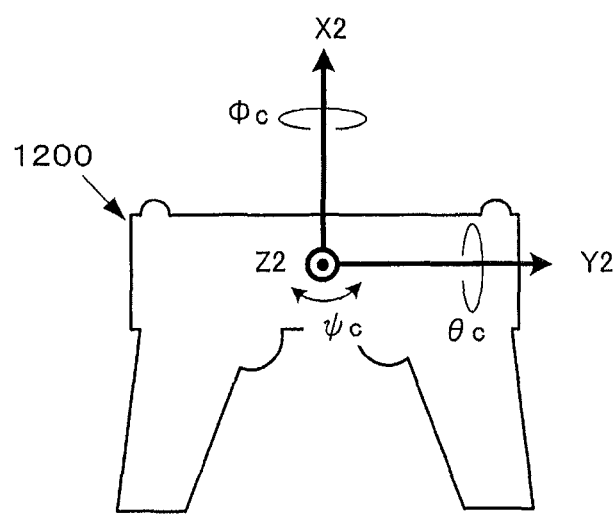
FIG. 2B is a view illustrating a coordinate system defined for a game controller.

FIG. 2A is a view illustrating a configuration example of the game controller 1200, and FIG. 2B is a view illustrating a coordinate system defined for the game controller 1200.

The game controller 1200 according to one embodiment of the invention is designed on the assumption that the game controller 1200 is held with both hands during use. Note that the game controller 1200 may also be designed to be held with one hand (e.g., gun-type controller).

A light-emitting marker 1202 is provided to the outer side of the game controller 1200. The game controller 1200 includes a speaker 1204, a vibrator 1206, a 6-axis sensor 1208, a controller board 1250, a battery (not illustrated in FIG. 2A), and the like.

The light-emitting marker 1202 is implemented by an LED or the like, and controlled by the controller board 1250. The light-emitting marker 1202 always emits light in a normal state.

The 6-axis sensor 1208 is a known motion trace sensor that detects movements in the longitudinal direction (X2-axis), the lateral direction (Y2-axis), and the vertical direction (Z2-axis) of the game controller 1200, and the rotation ($\Phi c$, $\Phi c$, $\Psi c$) around each axis. For example, the 6-axis sensor 1208 detects accelerations in the triaxial directions, and angular velocities around the three axes. The 6-axis sensor 1208 may detect accelerations in the triaxial directions, and geomagnetic directions (north, south, east, and west).

The controller board 1250 includes a CPU 1251, an IC memory 1252, a communication module 1253, an interface circuit 1254, and the like, and controls the operation of the game controller 1200, and communication with the outside. The interface circuit 1254 controls output of a control signal to the speaker 1204 and the vibrator 1206, and controls input of a signal from an operation button switch 1260, an arrow key 1262, a joystick 1264, and the like.

Figure 3A:
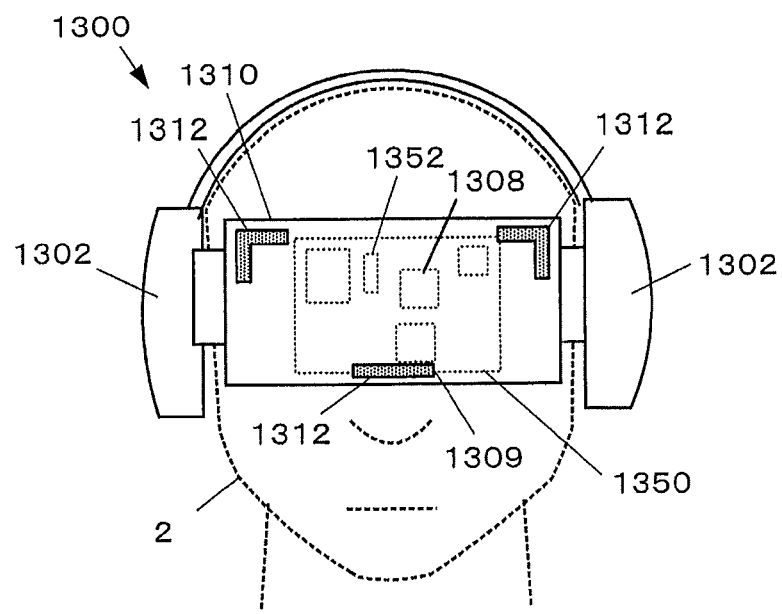
FIG. 3A is a front view illustrating a headset.
Figure 3B:
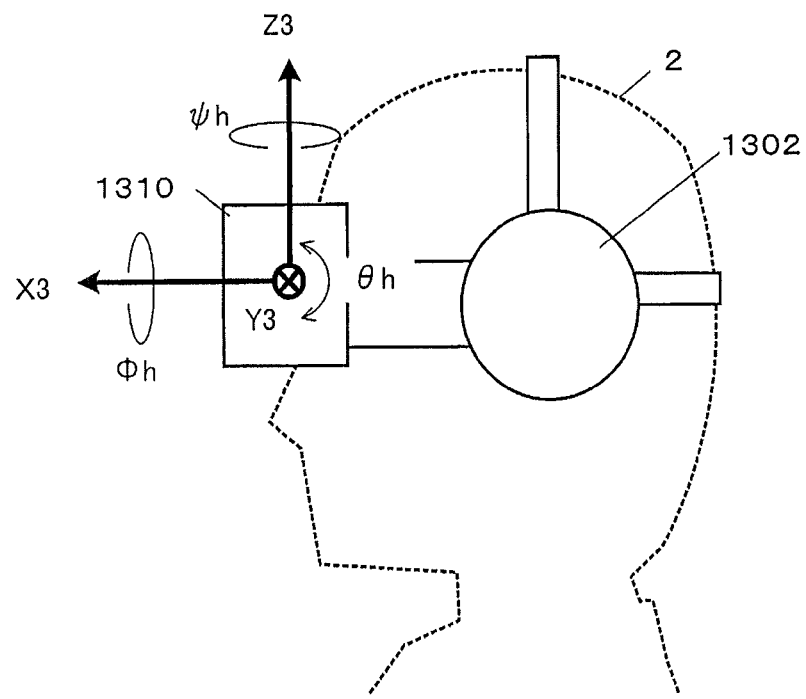
FIG. 3B is a side view illustrating a headset.

FIGS. 3A and 3B are views illustrating a configuration example of the headset 1300 according to one embodiment of the invention. FIG. 3A is a front view, and FIG. 3B is a side view.

The headset 1300 is designed to be worn on the head of the player 2. The headset 1300 provides image information and sound information to the player 2, and has a function of detecting the position and the posture of the head of the player 2 for implementing head tracking. For example, the headset 1300 includes a headphone 1302, a head-mounted display (HMD) 1310, and a headset board 1350.

It is desirable that the headphone 1302 be a closed stereo headphone.

The HMD 1310 may be implemented by a non-see-through (immersive) head-mounted display that provides a viewing angle that corresponds to the viewing angle of human vision, and a driver circuit that drives the head-mounted display.

For example, the HMD 1310 includes a communication IC that receives an image signal from the headset board 1350, an image display device and an optical element that present an image based on the received image signal to the eyes of the wearer at a viewing angle that corresponds to the naked-eye viewing angle, a 6-axis sensor 1308, an IC chip 1309 that calculates information about the acceleration and the posture of the head detected by the 6-axis sensor 1308, and a communication module 1352 for communicating with the game device main body 1002. Some of these elements may be included in the headset board 1350.

The 6-axis sensor 1308 is a known motion trace sensor that detects movements in the longitudinal direction (X3-axis), the lateral direction (Y3-axis), and the vertical direction (Z3-axis) of the HMD 1310 (i.e., the head of the player 2), and the rotation ($\Phi h$, $\Phi h$, $\Psi h$) around each axis. For example, the 6-axis sensor 1308 detects accelerations in the triaxial directions, and angular velocities around the three axes. The 6-axis sensor 1308 may detect accelerations in the triaxial directions, and geomagnetic directions (north, south, east, and west).

The headset board 1350 is a control board that is connected to each section of the headset 1300, and performs a calculation process required for the headset, and a data communication control process for communicating with the outside. For example, the headset board 1350 may be implemented by a CPU, an IC memory, an image processing LSI, a communication IC, an interface circuit, and the like.

Three light-emitting markers 1312 are provided to the front side of the HMD 1310. The light-emitting marker 1312 is implemented by an LED or the like, and controlled by the headset board 1350. The light-emitting marker 1312 always emits light in a normal state. The light-emitting marker 1312 is used as a marker for recognizing the presence or absence and the position of the HMD 1310 from the image captured by the color image sensor 1104 included in the range sensor unit 1100.

Figure 4:
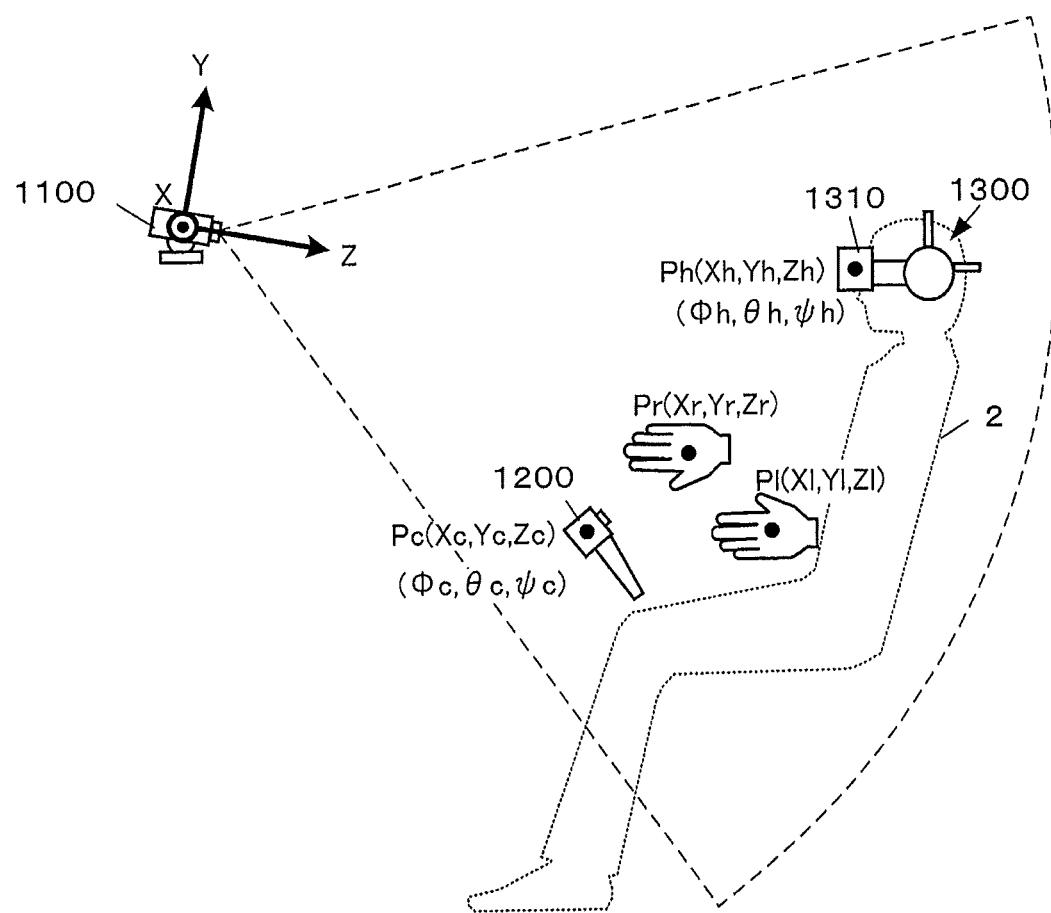
FIG. 4 is a view illustrating a coordinate system of a ranging space, and elements that are subjected to a ranging process and a recognition process.

FIG. 4 is a view illustrating the coordinate system of the ranging space, and the elements that are subjected to the ranging process and the recognition process.

The coordinate system of the ranging space is designed so that the range sensor unit 1100 corresponds to the origin, and the direction of the optical axis of the color image sensor 1104 is the depth axis (Z-axis). The scale of the ranging space is set to be the same as that of the real space. Each axial direction of the coordinate system of the ranging space is defined corresponding to the posture of the range sensor unit 1100. The posture of the range sensor unit 1100 is determined from the detection results of the 6-axis sensor 1108. Since the horizontal direction and the vertical direction of the real space can be calculated from the detection results of the 6-axis sensor 1109, the direction of the coordinate axis of the ranging space can be set along the horizontal direction and the vertical direction.

The game system 1000 according to one embodiment of the invention can obtain the position Ph of the HMD 1310, the position Pc of the game controller 1200, and the right hand position Pr and the left hand position Pl of the player 2 within the ranging space in a given cycle (e.g., every 100 ms) through the ranging process performed by the range sensor unit 1100.

Specifically, the presence of the HMD 1310 is recognized by recognizing the light-emitting marker 1312 of the HMD 1310 from the image captured by the color image sensor 1104 included in the range sensor unit 1100, and the position Ph of the HMD 1310 is determined from the position of the light-emitting marker 1312 in the image coordinate system, and the ranging results for the position of the light-emitting marker 1312. Note that the position Ph may be calculated from the relative positional relationship, the relative distance, and the size of the light-emitting marker 1312 with respect to the range sensor unit 1100. The position Pc of the game controller 1200 can be determined from the position of the light-emitting marker 1202 in the image coordinate system, and the ranging results for the position of the light-emitting marker 1202.

The posture ($\Phi h$, $\Phi h$, $\Psi h$) of the HMD 1310 (i.e., the line-of-sight direction (front direction) of the player who wears the HMD 1310) can be detected from the size, the tilt, and the deformation of each of the light-emitting markers 1312 within the image captured by the color image sensor 1104, and the size, the tilt, and the deformation of a figure formed by connecting the light-emitting markers 1312. It is possible to determine the posture of the HMD 1310 and a change in the posture of the HMD 1310 at the position Ph using the 6-axis sensor 1308 included in the HMD 1310. The posture ($\Phi c$, $\Phi c$, $\Psi c$) of the game controller 1200 can be detected from the size, the tilt, and the deformation of each of the light-emitting markers 1202 within the image captured by the color image sensor 1104, and the size, the tilt, and the deformation of a figure formed by connecting the light-emitting markers 1202. It is possible to determine the posture of the game controller 1200 and a change in the posture of the game controller 1200 at the position Pc using the 6-axis sensor 1208 included in the game controller 1200.

When the 6-axis sensor 1308 and the 6-axis sensor 1208 include a terrestrial magnetism sensor or the like, and can detect the posture with respect to the geomagnetic direction, the detected posture may be used as correction information when calculating the posture using the light-emitting marker 1312 and the light-emitting marker 1202, or the posture can be calculated without using the light-emitting marker 1312 and the light-emitting marker 1202.

The left hand position Pl and the right hand position Pr (i.e., gesture input operation indicator) are determined by recognizing an image area of the left hand and the right hand from the image captured by color image sensor 1104, and determining the left hand position Pl and the right hand position Pr from the position coordinates of the image area, and the ranging results for the position coordinates of the image area. Note that the hand image recognition process can be implemented by appropriately utilizing known technology.

The game system 1000 according to one embodiment of the invention reduces inconvenience that may occur when the HMD is used for a consumer stationary game device based on these parameter values, and improves usability. Specifically, when the player wears the headset 1300 without holding the game controller 1200, and cannot observe the state of the external world, the game system 1000 according to one embodiment of the invention assists the player by guiding the player so that the player can relatively easily find and hold the game controller 1200.

Principle

The HMD 1310 displays a guide display so that the player can easily find and hold the game controller 1200.

Figure 5:
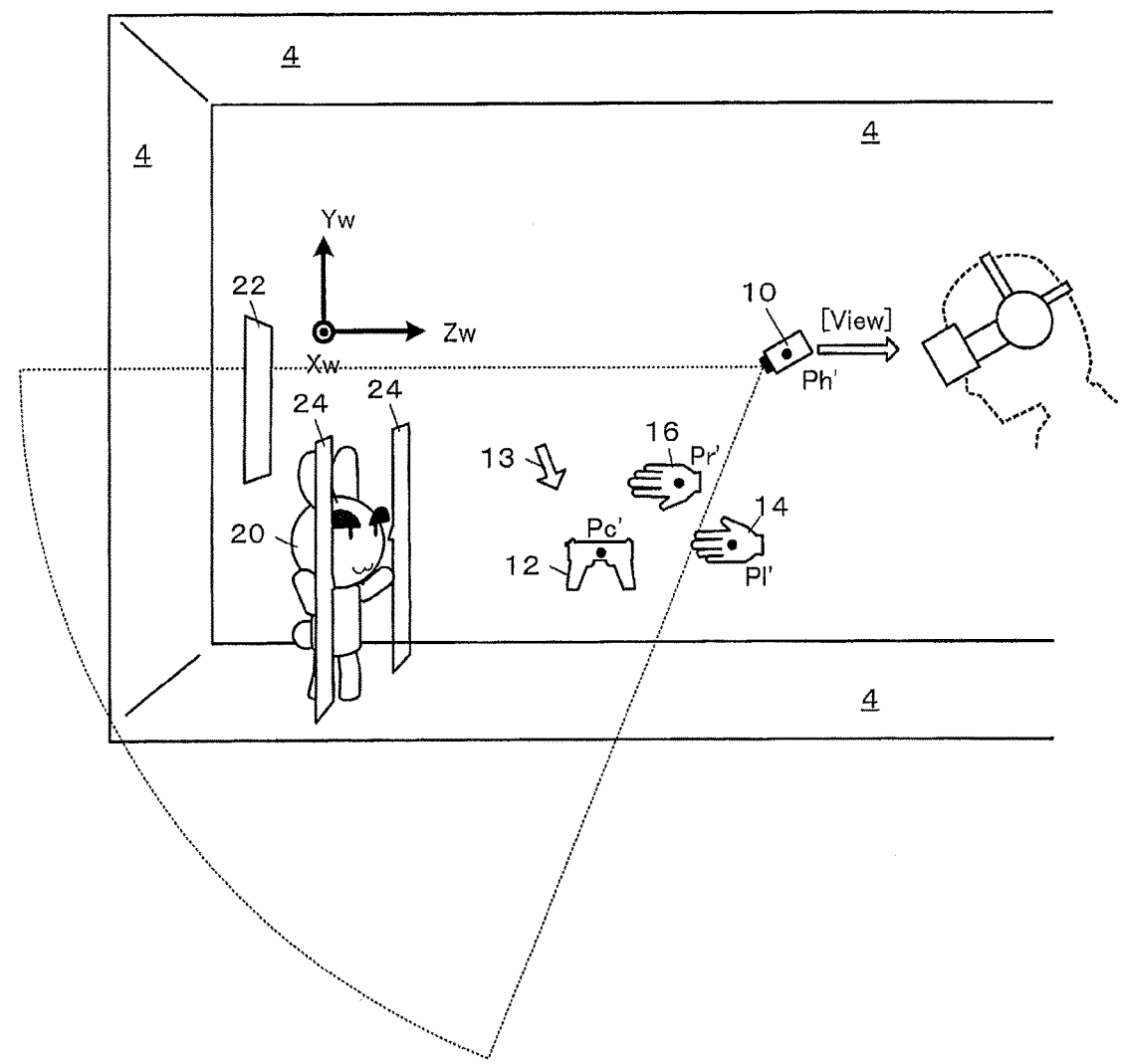
FIG. 5 is a view illustrating an example of a virtual space for generating a stereoscopic image (game image) that is displayed on an HMD, and an object that is disposed in the virtual space.

FIG. 5 is a view illustrating an example of a player assistance display virtual three-dimensional space for generating a player assistance display stereoscopic image that is displayed on the HMD 1310, and an object disposed within the player assistance display virtual three-dimensional space.

In one embodiment of the invention, the player assistance display virtual three-dimensional space is defined by a coordinate system in which the coordinate axis directions are defined along the horizontal direction and the vertical direction of the real space. The scale of the player assistance display virtual three-dimensional space is set to be the same as that of the real space. The origin of the coordinate system is set at the same position as the origin of the ranging space. The player assistance display virtual three-dimensional space is an example of a virtual space. The player assistance display virtual three-dimensional space is hereinafter appropriately referred to as "virtual space". A virtual space defined by a viewpoint coordinate system based on a virtual viewpoint (virtual stereo camera 10) for the HMD 1310 may be separately provided in order to generate a game image that is displayed on the HMD 1310. When the player plays a game in a microscopic world (e.g., insect game), the scale of the player assistance display virtual three-dimensional space may be set to differ from that of the real space.

A background object 4 (e.g., floor, wall, and ceiling) that provides the player with a sense of direction, a virtual stereo camera 10, a controller object 12, a direction guide object 13, a left hand object 14, and a right hand object 16 are disposed within the player assistance display virtual three-dimensional space. A guide character 20, a guide display panel 22, and a selection target 24 are also disposed within the player assistance display virtual three-dimensional space when displaying an operation guide display (e.g., an operation guide display that prompts the player to perform an operation input) to the player 2.

The virtual stereo camera 10 includes a right virtual camera and a left virtual camera for generating a stereoscopic image that is displayed on the HMD 1310. A rendering image of the player assistance display virtual three-dimensional space that is captured by the right camera is used as a right-eye image that is displayed on the HMD 1310, and a rendering image of the player assistance display virtual three-dimensional space that is captured by the left camera is used as a left-eye image that is displayed on the HMD 1310.

The virtual stereo camera 10 is disposed at a position Ph' of the HMD 1310 that is appropriately subjected to coordinate transformation from the ranging coordinate system to the coordinate system of the virtual space. The imaging angle of view of the virtual stereo camera 10 is set to be approximately the same as the angle of view of human vision. The optical axis direction is set to the direction of the longitudinal axis (X3-axis: FIG. 3B) detected by the 6-axis sensor 1308 included in the HMD 1310, and the rotation around the optical axis is controlled to be the same as the rotation around the longitudinal axis detected by the 6-axis sensor 1308. Specifically, the virtual stereo camera 10 is controlled so as to trace the motion of the head of the player 2. This function may be implemented by utilizing known HMD head tracking technology.

The controller object 12 is an object (i.e., first guide display) that represents the position of the game controller 1200. The controller object 12 is designed to imitate the game controller 1200 in a simplified manner. The controller object 12 is disposed at a position Pc' of the game controller 1200 that is appropriately subjected to coordinate transformation from the ranging coordinate system to the coordinate system of the virtual space. The size of the controller object 12 is set to be (almost) the same as that of the game controller 1200.

The direction guide object 13 is an object (i.e., first guide display) that is controlled to indicate the position of the controller object 12 in the virtual space. When the controller object 12 is not situated within the field of view (imaging angle of view) of the HMD 1310, the position of the direction guide object 13 is automatically adjusted so that the direction guide object 13 is displayed at a given position within the field of view of the HMD 1310. Specifically, the direction guide object 13 is displayed in a peripheral area of the display screen of the HMD 1310 at a position closest to the position Pc' of the game controller 1200 (see FIG. 6A).

The left hand object 14 and the right hand object 16 are indicator objects that indicate a position in the virtual space that corresponds to the position of the hand (gesture input operation indicator) in the real space (ranging space). The left hand object 14 and the right hand object 16 are used as a second guide display that allows the player to easily hold the game controller 1200. Specifically, the left hand object 14 and the right hand object 16 are respectively disposed at a left hand position Pl' and a right hand position Pr' of the player 2 that are appropriately subjected to coordinate transformation from the ranging coordinate system to the coordinate system of the virtual space. The left hand object 14 and the right hand object 16 respectively trace the motion of the left hand of the player 2 and the motion of the right hand of the player 2.

The guide character 20, the guide display panel 22, and the selection target 24 are disposed in the depth direction with respect to the virtual stereo camera 10 (i.e., disposed in front of the player 2).

The position of the guide character 20 and the position of the guide display panel 22 in the virtual space are not changed even when the position or the line-of-sight direction of the virtual stereo camera 10 has changed (e.g., even when the player 2 has moved his/her head while wearing the headset 1300). The guide character 20 is moved within the virtual space, while the guide display panel 22 is disposed at a fixed position within the virtual space.

The guide display panel 22 is a plate-like object that displays a text or a figure that represents the objective of an operation input, or prompts the player 2 to perform an operation input, for example.

The selection target 24 corresponds to a selection operation icon, for example. The selection target 24 displays a text or a figure that represents an option. The position of the selection target 24 is automatically controlled so that the position of the selection target 24 is (approximately) fixed within the imaging angle of view of the virtual stereo camera 10 (i.e., within the field of view of the HMD 1310) (described in detail later). The selection target 24 may be appropriately designed. In one embodiment of the invention, the selection target 24 is designed as a "balloon" that displays words that are spoken by the guide character 20.

Figure 6A:
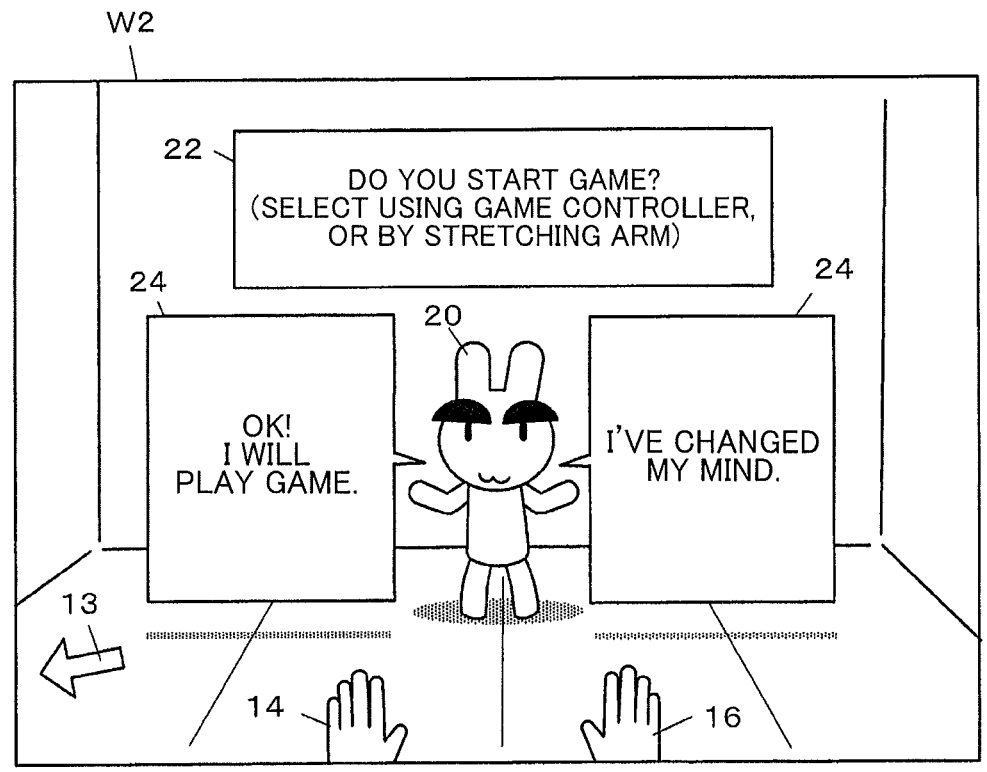
FIG. 6A is a view illustrating an example of a stereoscopic image (game image or game screen) that is displayed on an HMD.
Figure 6B:
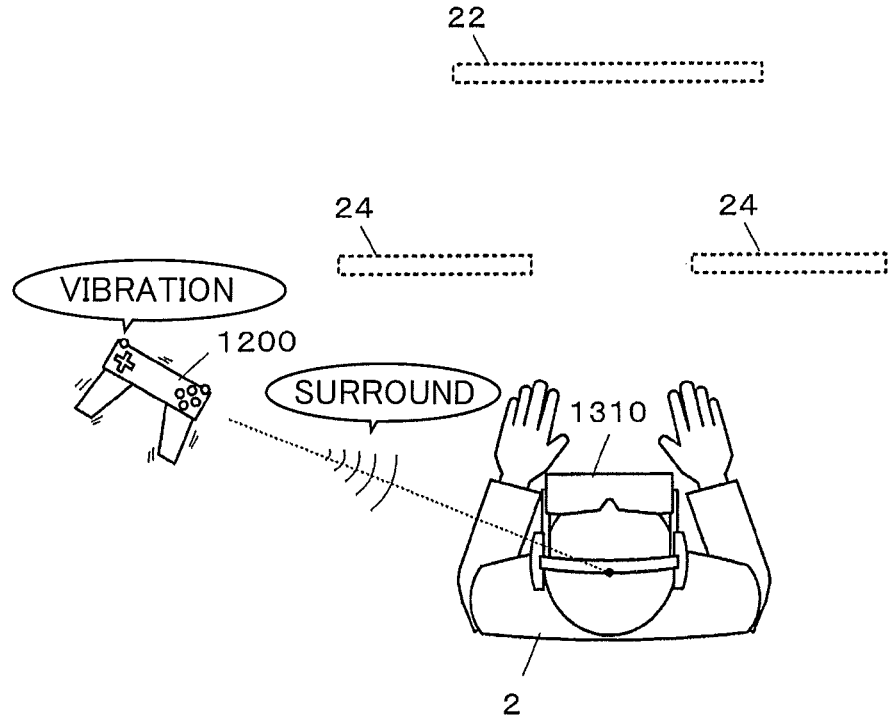
FIG. 6B is a view illustrating a player and the state around the player in the real world.
Figure 7A:
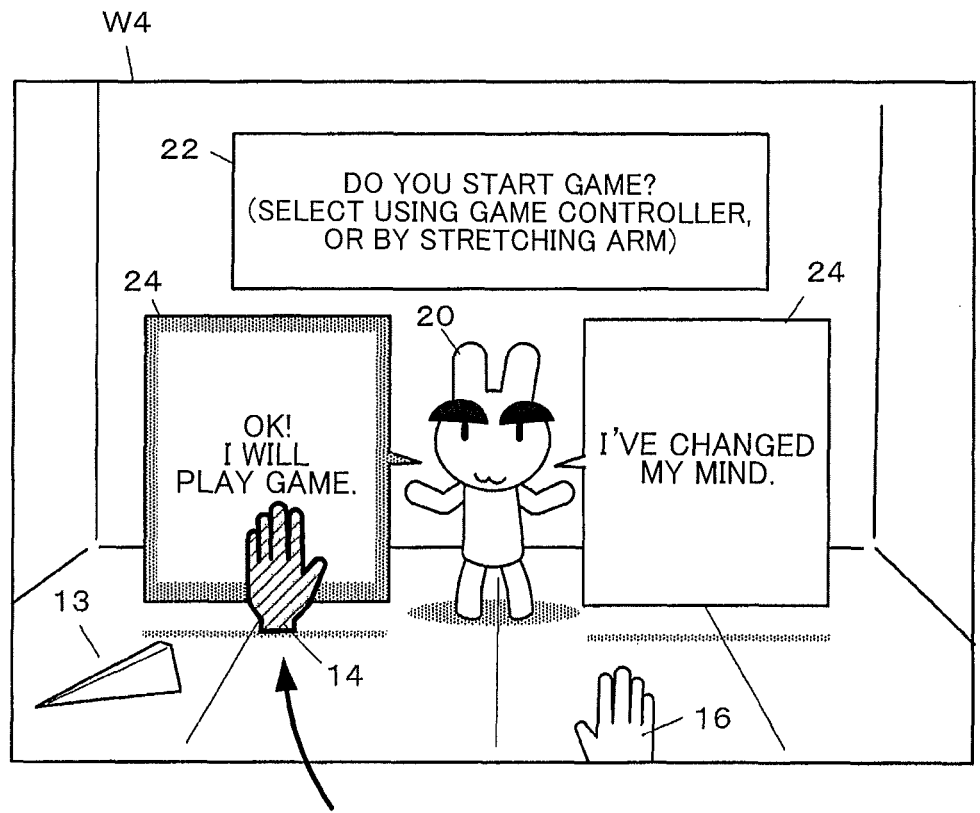
FIG. 7A is a view illustrating an example of a stereoscopic image (game image or game screen) that is displayed on an HMD.
Figure 7B:
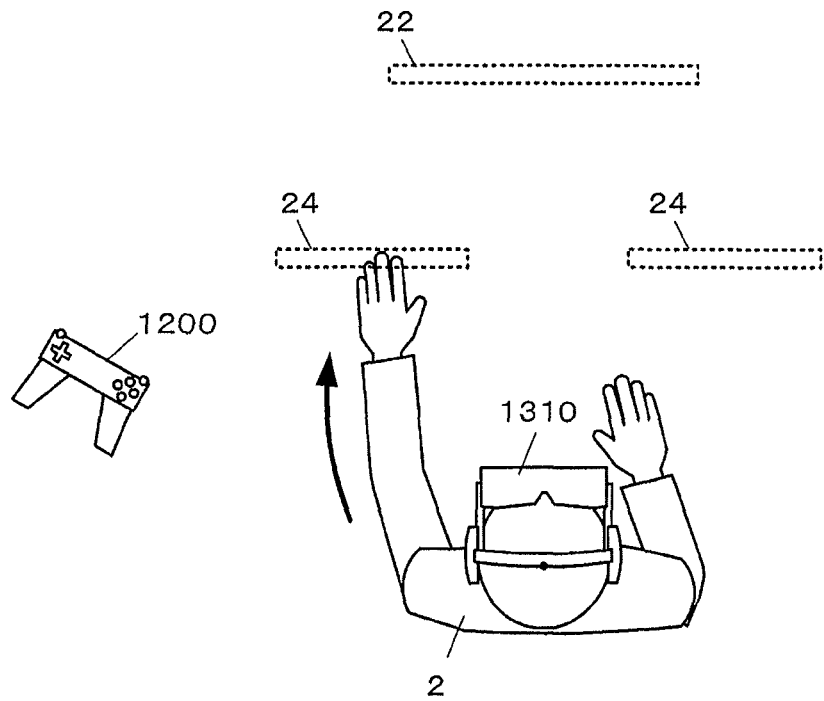
FIG. 7B is a view illustrating a player and the state around the player in the real world.
Figure 8A:
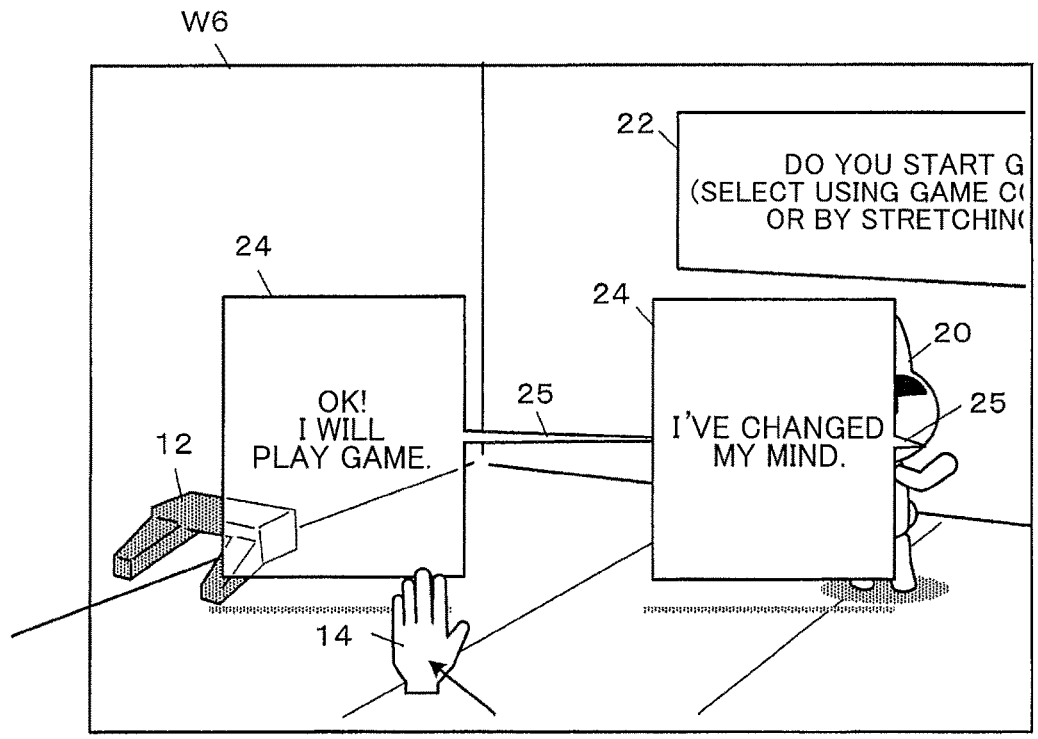
FIG. 8A is a view illustrating an example of a stereoscopic image (game image or game screen) that is displayed on an HMD.
Figure 8B:
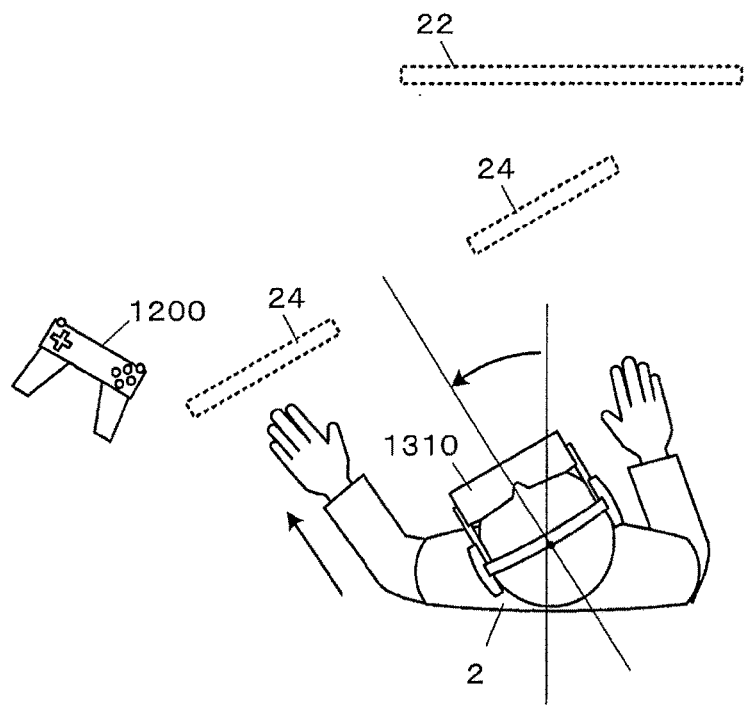
FIG. 8B is a view illustrating a player and the state around the player in the real world.

FIGS. 6A, 7A, and 8A are views illustrating an example of a stereoscopic image (game image or game screen) that is displayed on the HMD 1310, and FIGS. 6B, 7B, and 8B are views illustrating the player 2 in the real world, and the state around the player 2.

The player 2 observes the images illustrated in FIGS. 6A, 7A, and 8A before starting the game in a state in which the player 2 wears the headset 1300 (with both hands), and faces the touch panel 1004 (i.e., faces front).

Since the guide character 20, the guide display panel 22, and the selection target 24 are initially disposed in the vicinity of the origin of the virtual space (see FIG. 5), the guide character 20, the guide display panel 22, and the selection target 24 are displayed at the center of the stereoscopic image (game screen) W2 illustrated in FIG. 6A captured by the virtual stereo camera 10. The position of the selection target 24 in the virtual space is adjusted to follow the line-of-sight direction of the virtual stereo camera 10 so that the selection target 24 is necessarily displayed at a given position within the game screen (see FIG. 8A).

Since the player 2 does not hold the game controller 1200, the left hand object 14 and the right hand object 16 may be displayed (see FIG. 6A) depending on the position of each hand of the player 2. Since the controller object 12 is situated outside the imaging angle of view of the virtual stereo camera 10 (see FIG. 6B), the direction guide object 13 is displayed within the screen as the first guide display (see FIG. 6A).

The player 2 can perform an operation input by changing the position of each hand when the player 2 does not hold the game controller 1200.

In the example illustrated in FIG. 6A, the player 2 is asked whether or not to start playing the game. When the player 2 desires to hold the game controller 1200, and start playing the game, the player 2 stretches the left arm forward as if to touch the left selection target 24. The left hand object 14 is moved as the player 2 stretches the left arm forward. When the left hand object 14 has reached the left selection target 24, or is situated at a given distance from the left selection target 24, the display state of the left hand object 14 is changed (see the stereoscopic image (game screen) W4 illustrated in FIG. 7A). In the example illustrated in FIG. 7A, the display color of the left hand object 14 is changed. When the above state has been maintained for a given time, or the player 2 has made a given motion (e.g., has waved the left hand), it is determined that the left hand object 14 has selected the left selection target 24, and the option linked to the left selection target 24 has been selected. Specifically, it is determined that the player 2 has made a gesture for playing the game. Note that FIG. 7A illustrates another example of the direction guide object 13.

If the player 2 turns his/her head to the left referring to the direction guide object 13 illustrated in FIG. 7A, the direction of the virtual stereo camera 10 in the virtual space is moved to the left. Therefore, the stereoscopic image (game screen) W6 illustrated in FIG. 8A is displayed on the HMD 1310.

The direction guide object 13 displayed in FIGS. 6A and 7A is not displayed within the stereoscopic image (game screen) W6 (i.e., deleted from the virtual space) since the controller object 12 is situated within the imaging range of the virtual stereo camera 10. Specifically, the first guide display is changed from the direction guide object 13 to the controller object 12.

Since the selection target 24 is displayed at a given position within the stereoscopic image (game screen), the player does not lose sight of the selection target 24. A front direction guide 25 (i.e., the indicator of the balloon in the example illustrated in FIG. 8A) is provided that indicates the front direction (i.e., the direction toward the touch panel 1004) of the player 2 at the game play position, and the player 2 can reliably determine the front direction even when the player 2 has turned his/her head.

Part or the entirety of the controller object 12 may be hidden behind another object (e.g., selection target 24) depending on the direction of the face of the player 2 (i.e., the line-of-sight direction of the virtual stereo camera 10). The controller object 12 may be hidden behind an arbitrary object. For example, the controller object 12 may be hidden behind the guide character 20, the guide display panel 22, the background object, or the like. In this case, a process that displays the controller object 12 is performed. Specifically, the object behind which the controller object 12 is hidden is displayed in a semi-transparent state (see FIG. 8A), or the model of the object behind which the controller object 12 is hidden is temporarily changed so that the controller object 12 can be observed. For example, an eyehole is formed in the object, or the corner of the object is removed. In the example illustrated in FIG. 8A, the controller object 12 is hidden behind the selection target 24.

In one embodiment of the invention, the horizontal direction and the vertical direction of the virtual space are the same as those of the real world (real space) in which the player 2 exists, and the scale of the virtual space is the same as that of the real world (real space). The imaging angle of view of the virtual stereo camera 10 is set to be the same as the angle of view of human vision. Therefore, the player 2 (user) observes the stereoscopic image displayed on the HMD 1310 as a virtual reality image that can be observed with the same sense of distance as the actual sense of distance. Specifically, the player 2 can easily reach the game controller 1200 by stretching the left arm toward the position where the controller object 12 is displayed. In this case, since the left hand object 14 (or the right hand object 16) is moved within the stereoscopic image as the player 2 stretches the left arm to indicate the latest hand position, the player 2 can easily hold the game controller 1200.

The game system 1000 according to one embodiment of the invention can also guide the player 2 to the game controller 1200 using vibrations generated by the game controller 1200, and a signal sound (guide sound) output from the headphone 1302.

As illustrated in FIG. 6B, when it has been determined that the player 2 does not hold the game controller 1200, the vibrator 1206 (see FIG. 2A) is operated so that the game controller 1200 vibrates. It may be determined that the player 2 does not hold the game controller 1200 1) when the signal detected by the 6-axis sensor 1208 has not changed for a given time, 2) when an operation input performed using the operation button switch 1260 has not been detected for a given time, 3) when the relative distance from the position Pc of the game controller 1200 to the left hand position Pl or the right hand position Pr has become equal to or longer than a reference value, or a combination thereof, for example.

The player 2 can determine the direction in which the game controller 1200 is present based on vibration sound from the game controller 1200. The player 2 can immediately determine the presence of the game controller 1200 when the player 2 has touched the game controller 1200 that vibrates.

The headphone 1302 outputs the signal sound using a surround technique so that the player 2 can hear the signal sound from the position Pc of the game controller 1200 with respect to the position Ph of the HMD 1310. The surround technique (function) may be implemented by known technology. The player 2 can determine the position of the game controller 1200 from the direction of the signal sound to find and hold the game controller 1200. In this case, the volume or the pitch of the signal sound may be changed, or the cycle of a pulsed sound may be changed corresponding to the relative distance between the position of the hand (right hand position Pr or left hand position Pl) and the position Pc of the game controller 1200.

Functional Configuration

A functional configuration example for implementing one embodiment of the invention is described below.

Figure 9:
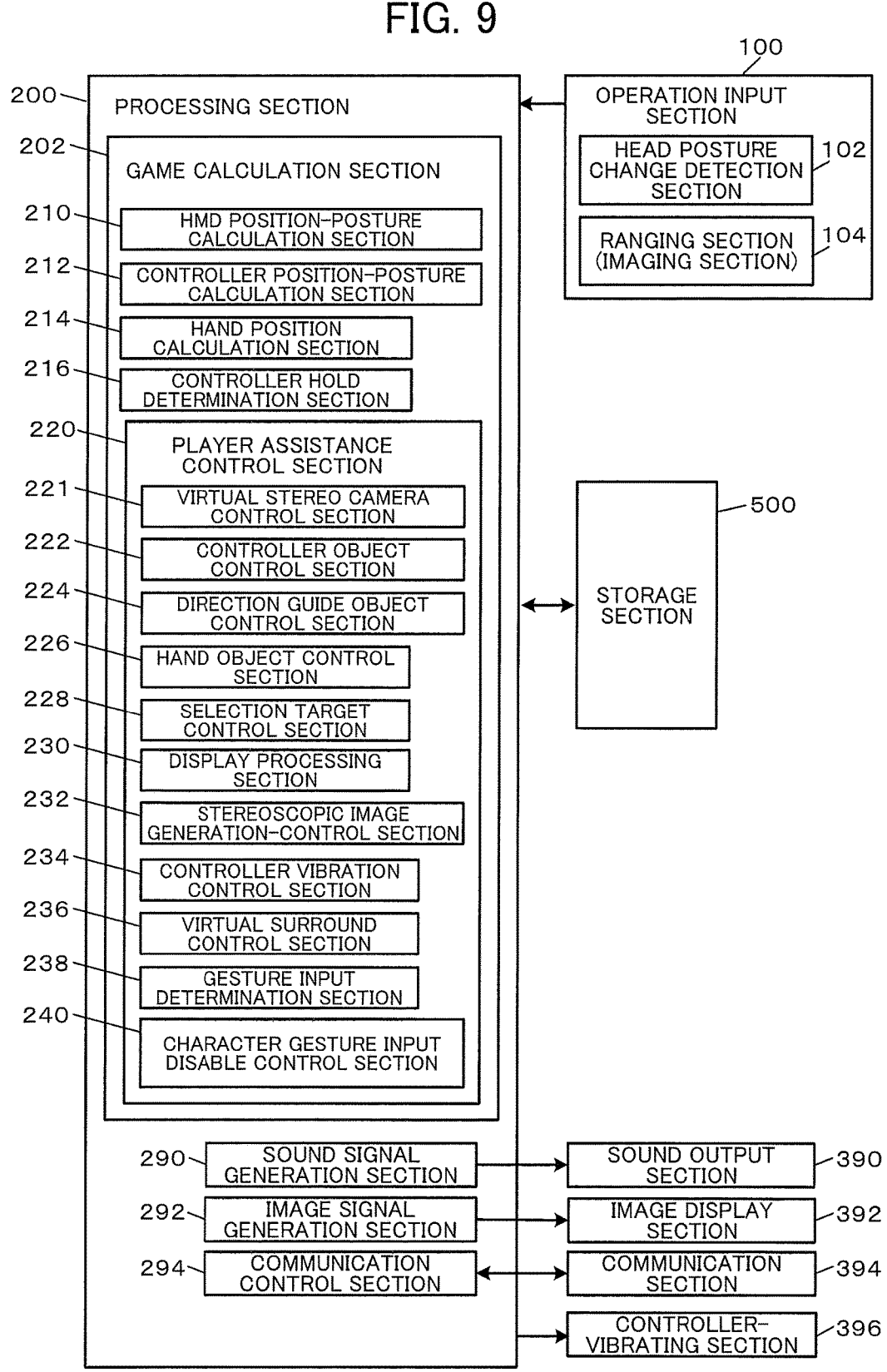
FIG. 9 is a functional block diagram illustrating a functional configuration example of a game system.

FIG. 9 is a functional block diagram illustrating a functional configuration example of the game system 1000 according to one embodiment of the invention. The game system 1000 according to one embodiment of the invention includes an operation input section 100, a processing section 200, a sound output section 390, an image display section 392, a communication section 394, a controller-vibrating section 396, and a storage section 500. In FIG. 9, the operation input section 100, the sound output section 390, the image display section 392, and the controller-vibrating section 396 are excluded from the main functional blocks of the game device main body 1002.

The operation input section 100 is a means that allows the player to perform an input operation. The operation input section 100 may be implemented by a known operation input device, such as a joystick, a push switch, a lever, a volume, a pedal switch, a keyboard, a mouse, a trackpad, a trackball, or a gesture input device. The touch panel 1004 and the game controller 1200 (see FIG. 1) correspond to the operation input section 100.

The operation input section 100 includes a head posture change detection section 102 and a ranging section 104.

The head posture change detection section 102 detects the posture of the head of the player 2 and a change in the posture of the head of the player 2, and outputs a detection signal to the processing section 200. For example, the head posture change detection section 102 may be implemented by utilizing a gyro sensor or an acceleration sensor, or utilizing known head tracking technology that recognizes a human head from an image captured by an image sensor. The HMD 1310 (i.e., 6-axis sensor 1308 and IC chip 1309) included in the headset 1300 (see FIG. 3A) corresponds to the head posture change detection section 102. The range sensor unit 1100 also corresponds to the head posture change detection section 102 when the posture of the HMD 1310 is calculated from the image captured by the range sensor unit 1100.

The ranging section 104 captures the player 2 and the state around the player 2 in a given cycle to measure the distance to each object, and outputs the captured image data and the ranging results to a sequential processing section 200. The range sensor unit 1100 (see FIG. 1) correspond to the ranging section 104.

The processing section 200 is implemented by electronic parts such as a microprocessor (e.g., CPU and GPU), an application-specific integrated circuit (ASIC), FPGA, and an IC memory. The processing section 200 exchanges data with each functional section including the operation input section 100 and the storage section 500. The processing section 200 performs various calculation processes based on a given program, data, and the operation input signal from the operation input section 100, and controls the game system 1000. The control board 1050 (see FIG. 1) correspond to the processing section 200.

The processing section 200 includes a game calculation section 202, a sound signal generation section 290, an image signal generation section 292, and a communication control section 294.

The game calculation section 202 executes various game processes.

For example, the game calculation section 202 may perform 1) a process that disposes the background object, a player character object, and the virtual stereo camera 10 in the virtual space, 2) a process that controls the motion of the player character object based on the operation input signal from the operation input section 100, 3) a process that synchronizes the posture of the virtual stereo camera 10 with the posture (change in posture) of the head of the player 2 based on the detection information from the head posture change detection section 102, performs a rendering process on the image of the game space captured by the virtual stereo camera 10, and displays the resulting image on the HMD 1310 as a stereoscopic image, 4) a game end determination process, 5) a game result calculation process, 6) a time measurement process, and the like. The game calculation section 202 may appropriately perform a process other than these processes corresponding to the game.

The game calculation section 202 includes an HMD position-posture calculation section 210, a controller position-posture calculation section 212, a hand position calculation section 214, a controller hold determination section 216, and a player assistance control section 220 in order to improve usability when using the HMD.

The HMD position-posture calculation section 210 calculates the position and the posture of the HMD 1310 in the real space in a given cycle (e.g., every 10 ms). The HMD position-posture calculation section 210 calculates the position Ph of the HMD 1310 (or the head of the player 2) from the image obtained by the ranging section 104 and the ranging results, and calculates (obtains) the posture ($\Phi h$, $\Phi h$, $\Psi h$) of the HMD 1310 based on the detection information from the head posture change detection section 102.

The position Ph may be calculated by appropriately utilizing known technology. For example, the three light-emitting markers 1312 included in the HMD 1310 may be extracted from the image obtained by the ranging section 104, the X-axis coordinate value and the Y-axis coordinate value may be determined from the coordinates of the intermediate position within the image, and the Z-axis coordinate value may be determined from the ranging results corresponding to the coordinate values. The posture may be calculated by utilizing known technology that recognizes the light-emitting marker 1312 and a given geometrical pattern printed on the front side or the side of the HMD 1310 from the image captured by the color image sensor 1104, and calculates the posture.

The controller position-posture calculation section 212 calculates the position Pc of the game controller 1200 in a given cycle (e.g., every 10 ms). The controller position-posture calculation section 212 calculates the position Pc of the game controller 1200 from the image obtained by the ranging section 104 and the ranging results.

The position Pc may be calculated by appropriately utilizing known technology. For example, the two light-emitting markers 1202 included in the game controller 1200 may be extracted from the image obtained by the ranging section 104, the X-axis coordinate value and the Y-axis coordinate value may be determined from the coordinates of the intermediate position within the image, and the Z-axis coordinate value may be determined from the ranging results corresponding to the coordinate values. Alternatively, the game controller 1200 may be recognized from the image captured by the color image sensor 1104 to determine the position Pc.

The hand position calculation section 214 calculates a virtual position (that corresponds to the position of the gesture input operation indicator in the real space) in the virtual space (player assistance display virtual three-dimensional space) that is the display image space of the HMD 1310. The hand position calculation section 214 calculates the left hand position Pl and the right hand position Pr of the player 2 in a given cycle (e.g., every 10 ms). Specifically, the hand position calculation section 214 tracks the position of each hand of the player 2.

The hand position (i.e., the virtual position of the left hand and the virtual position of the right hand) may be calculated by appropriately utilizing known technology. For example, a human hand may be recognized from the image captured by the color image sensor 1104, the X-axis coordinate value and the Y-axis coordinate value may be determined from the coordinates within the image, and the Z-axis coordinate value may be determined from the hand ranging results corresponding to the coordinate values.

The controller hold determination section 216 determines whether or not the player 2 holds the game controller 1200. Specifically, the controller hold determination section 216 detects that the player 2 holds the game controller 1200. An arbitrary determination method and an arbitrary detection method may be appropriately selected. For example, it may be determined that the player 2 does not hold the game controller 1200 when an operation input has not been detected for a given time (e.g., 5 seconds), or when a change in the posture of the game controller 1200 has not been detected for a given time (e.g., 5 seconds). If a sensor that detects capacitance can be provided in the grip of the game controller 1200, whether or not the player 2 holds the game controller 1200 may be determined (detected) from a change in capacitance due to contact with a human hand.

The player assistance control section 220 performs the main control process that reduces inconvenience when using the HMD, and improves usability.

The player assistance control section 220 includes a virtual stereo camera control section 221, a controller object control section 222, a direction guide object control section 224, a hand object control section 226, a selection target control section 228, a display processing section 230, a stereoscopic image generation-control section 232, a controller vibration control section 234, a virtual surround control section 236, a gesture input determination section 238, and a character gesture input disable control section 240.

The virtual stereo camera control section 221 controls the position and the posture of the virtual stereo camera 10 in the virtual space so as to correspond to (agree with) the position and the posture of the HMD 1310 in the real space. Specifically, the virtual stereo camera control section 221 controls the position and the posture of the virtual stereo camera 10 so as to be synchronized with (follow) the position and the line-of-sight direction (front direction) of the head of the player 2 who wears the HMD 1310 in the real space.

The controller object control section 222 disposes the controller object 12 in the virtual space, and controls the display state of the controller object 12. Specifically, the controller object control section 222 sets the display state of the controller object 12 to a normal display state until the relative distance between the game controller 1200 and the hand of the player 2 satisfies a given proximity condition, and changes the display state of the controller object 12 to a special display state when the proximity condition has been satisfied.

The direction guide object control section 224 disposes the direction guide object 13 in the virtual space, and controls the position (movement) and the posture of the direction guide object 13. Specifically, the direction guide object control section 224 controls the position of the direction guide object 13 so that the direction guide object 13 is always situated at a given position within the field of view (game screen) of the HMD 1310, and controls the posture of the direction guide object 13 so that the direction guide object 13 faces in the direction of the game controller 1200 with respect to (when viewed from) the HMD 1310.

The hand object control section 226 disposes the left hand object 14 and the right hand object 16 in the virtual space, and controls the movement of the left hand object 14 and the right hand object 16. Specifically, the hand object control section 226 controls the left hand object 14 and the right hand object 16 so that the left hand object 14 and the right hand object 16 are situated at positions within the virtual space that correspond to the left hand position and the right hand position relative to the HMD 1310 in the real space.

The selection target control section 228 displays and controls a display object that allows the user to perform a gesture input. Since a gesture input is determined based on the positional relationship between the display object and the operation indicator (e.g., the hand of the player), the selection target control section 228 displays and controls an "input determination object". In one embodiment of the invention, the selection target 24 that is linked to an operation input is used as the input determination object, and disposed in the virtual space as a "balloon" used in connection with the guide character 20. The selection target 24 is used as the target position for the hand of the player. The selection target control section 228 controls the position of the selection target 24 so that the selection target 24 is always situated at a given position within the field of view (game screen) of the HMD 1310, and controls the selection target 24 so that the selection target 24 faces the virtual stereo camera 10. The selection target control section 228 controls the selection target 24 so that the front direction guide 25 indicates the direction toward a given position (e.g., the position of the origin) in the virtual space. The object may be deformed while fixing the end of the front direction guide 25 at a given position of the guide character 20 so that an expandable "balloon" always indicates the guide character 20.

Note that the display state of the selection target 24 may be appropriately set corresponding to the game and the like. For example, the selection target 24 may be a hand motion start point, a hand motion end point, a path that connects the hand motion start point and the hand motion end point, or the like. The selection target 24 may be a character or a background that appears in the game.

The display processing section 230 performs image processing that displays the controller object 12 so that the player can observe the controller object 12 when another object is situated between the virtual stereo camera 10 and the controller object 12, and part or the entirety of the controller object 12 is hidden behind the other object. For example, the display processing section 230 displays the object behind which the controller object 12 is hidden in a semi-transparent state, or changes the model of the object behind which the controller object 12 is hidden (e.g., forms an eyehole).

Likewise, the display processing section 230 performs image processing that displays the selection target 24 so that the player can observe the selection target 24 when another object is situated between the virtual stereo camera 10 and the selection target 24, and part or the entirety of the selection target 24 is hidden behind the other object.

The display processing section 230 performs image processing that displays the indicator object (e.g., left hand object 14 or right hand object 16) so that the player can observe the indicator object when another object is situated between the virtual stereo camera 10 and the indicator object, and part or the entirety of the indicator object is hidden behind the other object.

The stereoscopic image generation-control section 232 performs a control process that generates an image of the virtual space in which the field of view changes corresponding to the position and the posture of the HMD 1310. Specifically, the stereoscopic image generation-control section 232 performs a rendering process on the images of the virtual space captured by the left camera and the right camera included the virtual stereo camera 10 to generate a left-eye image and a right-eye image that are displayed on the HMD 1310. The stereoscopic image generation-control section 232 thus generates a stereoscopic image used as the game image (game screen). The stereoscopic image generation-control section 232 is an example of a virtual space image generation means.

The controller vibration control section 234 performs a control process that causes the game controller 1200 to vibrate when the player 2 does not hold the game controller 1200.

The virtual surround control section 236 performs a virtual surround process on stereo sound when the player 2 does not hold the game controller 1200 so that the player 2 can hear the signal sound from the direction of the game controller 1200 with respect to (when viewed from) the HMD 1310. Since the headphone 1302 outputs sound to the player 2, known virtual surround technology or virtual surround technology may be appropriately used.

The gesture input determination section 238 determines whether or not an operation input has been performed on an object disposed in the virtual space based on the virtual position (left hand position Pl or right hand position Pr) of the left hand or the right hand (i.e., operation indicator) of the player 2, and the position of the object in the virtual space.

In one embodiment of the invention, whether or not the selection target 24 has been selected is determined based on the position of the operation indicator in the virtual space, and the position of the selection target 24. Specifically, it is determined that the selection target 24 has been selected when the relationship between the left hand position Pl' or the right hand position Pr' in the virtual space and the position of the selection target 24 satisfies a reach determination condition. The gesture input determination section 238 can determine a gesture input performed on the guide character 20 in a similar manner.

The character gesture input disable control section 240 disables a determination as to a gesture input (e.g., an operation input that strokes the guide character 20) performed on the character (e.g., guide character 20 illustrated in FIG. 5) disposed in the virtual space when the selection target 24 is displayed (disposed), and enables such a determination when the selection target 24 is not displayed (disposed). Specifically, the character gesture input disable control section 240 temporarily excludes the gesture input target that is disposed in the virtual space in addition to the selection target 24 from the operation target, and enables only a gesture input performed on the selection target 24 that is given priority to prevent an unintended or undesired gesture input.

The sound generation 290 is implemented by a microprocessor such as a digital signal processor (DSP), its control program, and the like. The sound generation section 290 generates sound signals of a game sound (e.g., effect sound, background music (BGM), and operation sound)

based on the processing results of the game calculation section 202, and outputs the generated sound signals to the sound output section 390.

The sound output section 390 is implemented by a device that outputs sound (e.g., effect sound and BGM) based on the sound signals input from the sound generation section 290. The headphone 1302 included in the headset 1300 (see FIG. 3A) corresponds to the sound output section 390.

The image signal generation section 292 outputs image signals (e.g., the image data generated by the stereoscopic image generation-control section 232, and the image data of the setting screen of the game system 1000) to the image display section 392.

The image display section 392 displays an image based on the image signals input from the image signal generation section 292. For example, the image display section 392 is implemented by an image display device such as a flat panel display, a cathode-ray tube (CRT), or a projector. The touch panel 1004 (see FIG. 1) and the HMD 1310 (see FIG. 3A) correspond to the image display section 392.

The communication control section 294 performs a data communication process to exchange data with an external device through the communication section 394.

The communication section 394 is implemented by a transceiver, a modem, a terminal adapter (TA), a jack for a communication cable, a control circuit, and the like. The communication section 394 communicates with an external server system and the like through a communication network. The communication section 394 also implements wireless communication with a wireless device such as the game controller 1200.

The controller-vibrating section 396 causes the game controller 1200 to vibrate based on a vibration control signal output from the game calculation section 202. The vibrator 1206 and the controller board 1250 (see FIG. 2A) correspond to the controller-vibrating section 396.

The storage section 500 stores a program, data, and the like that implement a function for causing the processing section 200 to control the game system 1000. The storage section 500 is used as a work area for the processing section 200, and temporarily stores the data input from the operation input section 100, the results of calculations performed by the processing section 200, and the like. The function of the storage section 500 is implemented by an IC memory (e.g., RAM or ROM), a magnetic disk (e.g., hard disk), an optical disk (e.g., CD-ROM or DVD), or the like. The IC memory 1052 (see FIG. 1) correspond to the storage section 500.

Figure 10:
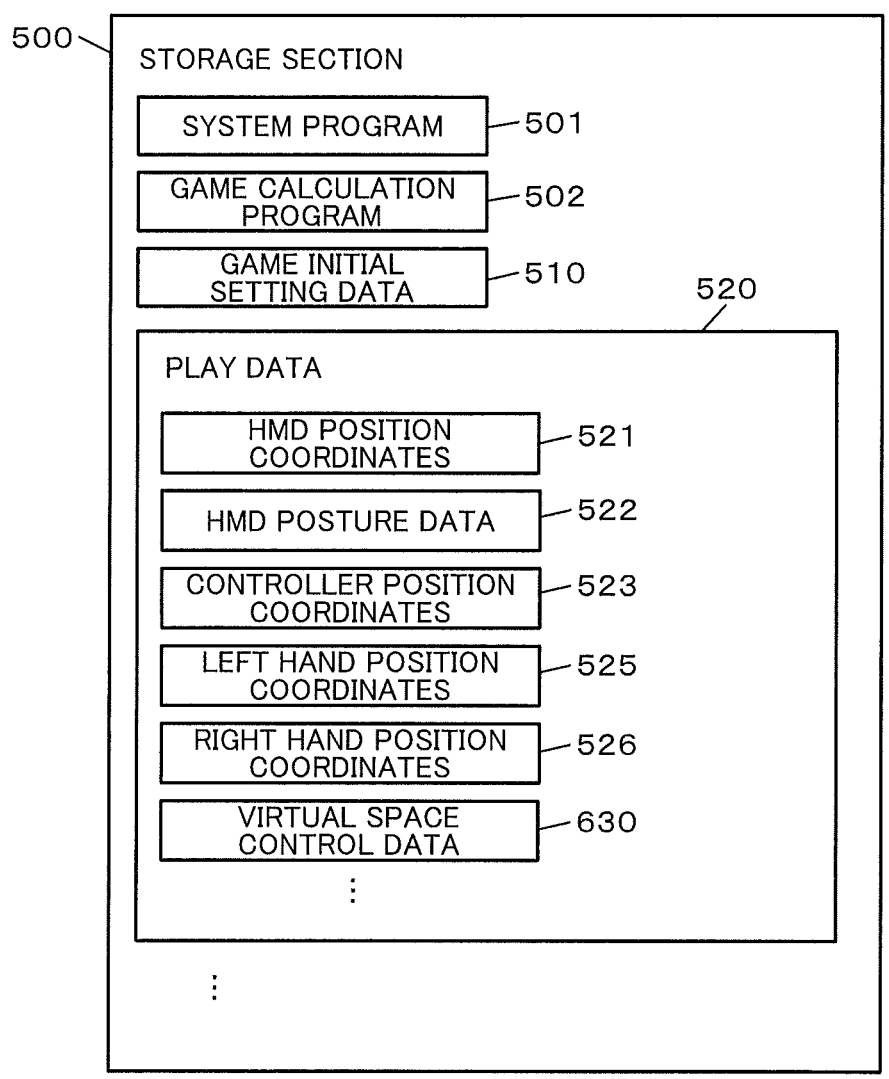
FIG. 10 is a view illustrating an example of a program and data that are stored in a storage section.

FIG. 10 is a view illustrating an example of the program and the data stored in the storage section 500 according to one embodiment of the invention. The storage section 500 stores a system program 501, a game calculation program 502, game initial setting data 510, and play data 520. Note that the storage section 500 may appropriately store additional information.

The processing section 200 reads and executes the system program 501, and causes the game system 1000 to implement a basic input-output function necessary for a computer.

The game calculation program 502 is a program that causes the processing section 200 to implement the functions of the game calculation section 202.

The game initial setting data 510 includes initial setting data that defines the game space, the rules of the game, and various objects that appear in the game.

The play data 520 includes player assistance control data, and various types of data that describes the game status (progress of the game). In one embodiment of the invention, the play data 520 includes HMD position coordinates 521 (i.e., the position Ph of the HMD 1310), HMD posture data 522, controller position coordinates 523 (i.e., the position Pc of the game controller 1200), left hand position coordinates 525 (left hand position Pl), and right hand position coordinates 526 (right hand position Pr) in the ranging space (real space). The play data 520 also includes virtual space control data 630. Note that the play data 520 may appropriately include additional information.

Figure 11:
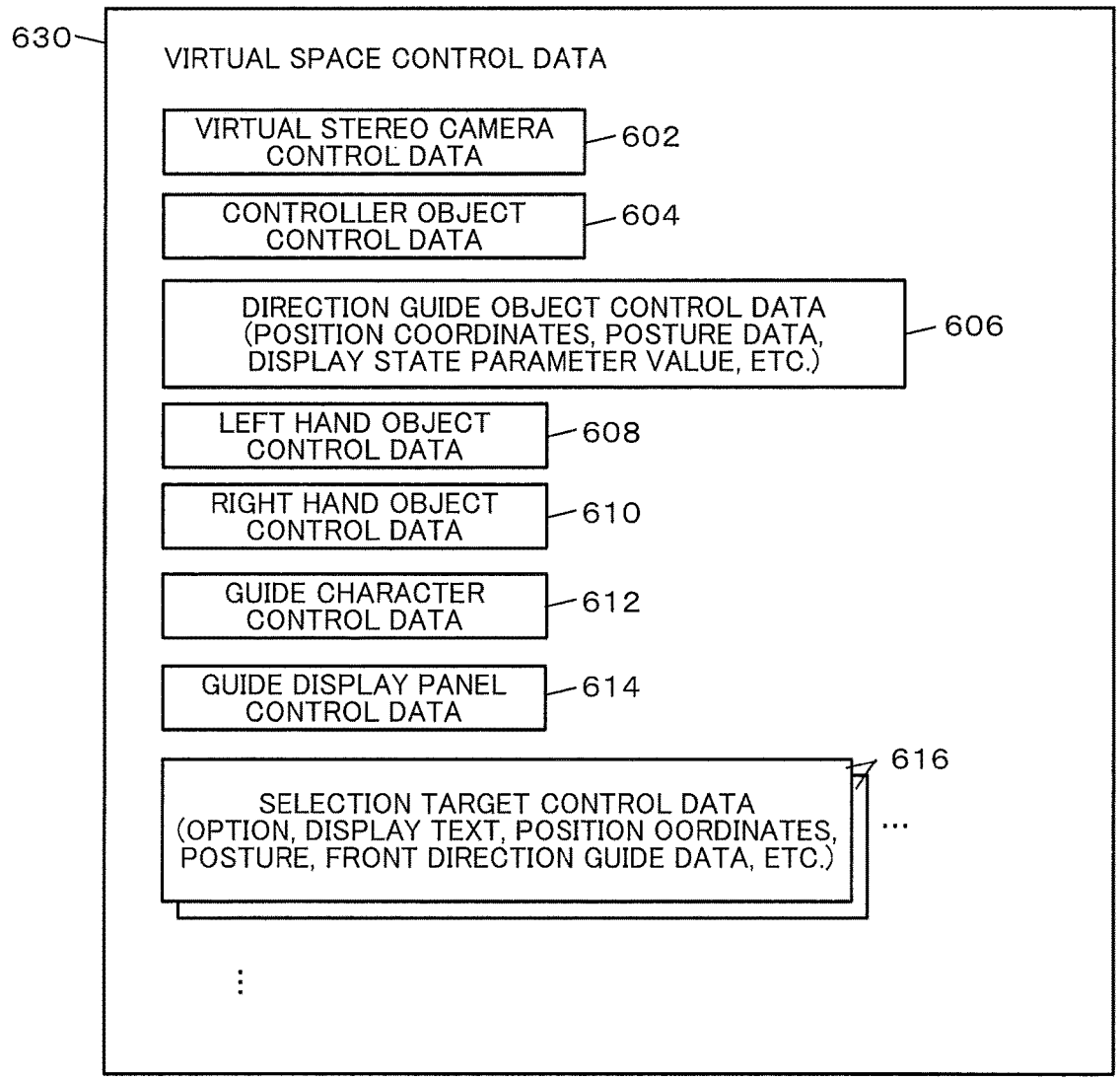
FIG. 11 is a view illustrating a data configuration example of virtual space control data.

The virtual space control data 630 is data that represents the virtual three-dimensional space (virtual space) that forms the game space, and includes data that manages the placement of the player assistance display object. As illustrated in FIG. 11, the virtual space control data 630 includes virtual stereo camera control data 602, controller object control data 604, direction guide object control data 606, left hand object control data 608, right hand object control data 610, guide character control data 612, guide display panel control data 614, and selection target control data 616, for example. Note that the virtual space control data 630 may appropriately include additional information.

Operation

Figure 12:
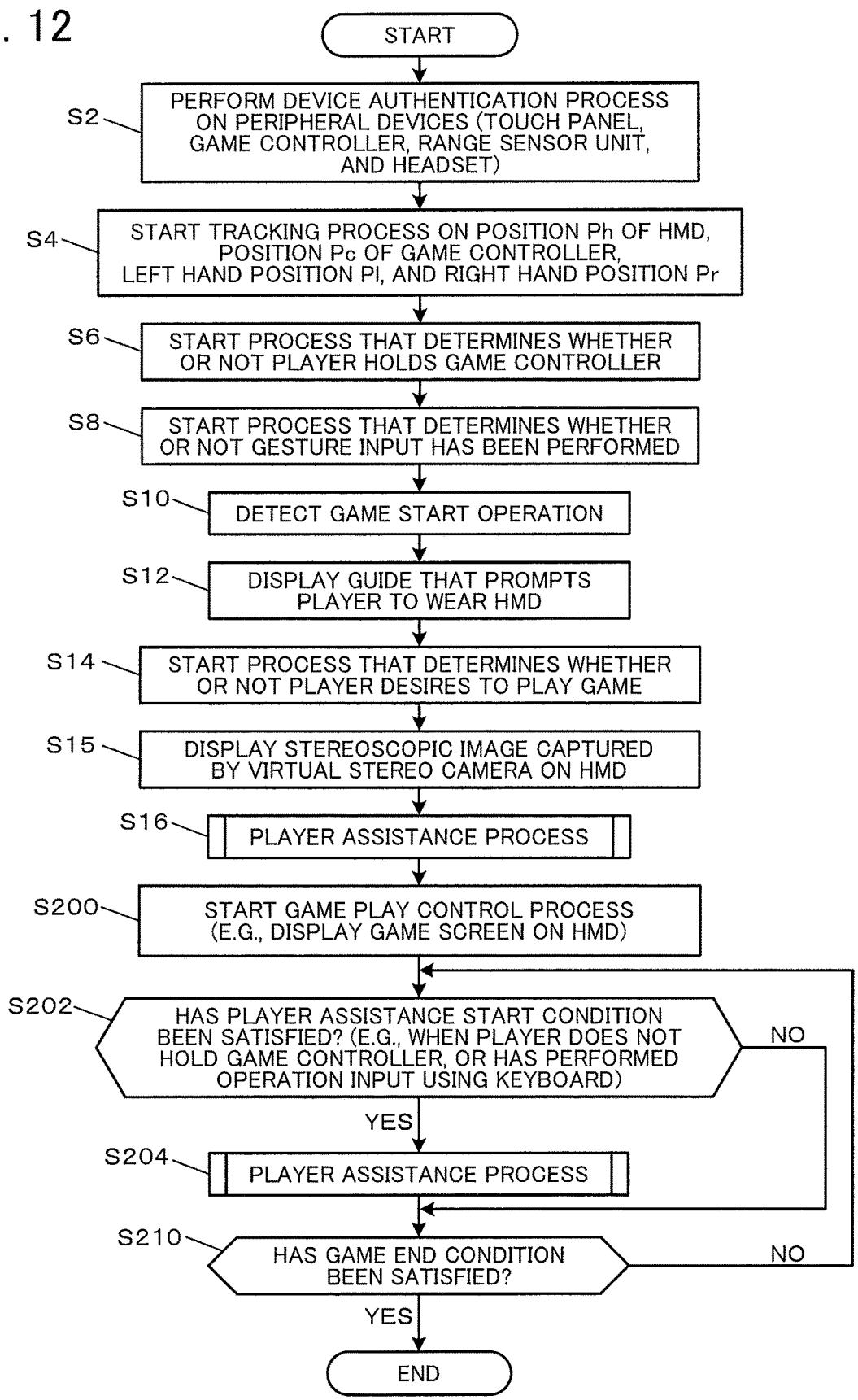
FIG. 12 is a flowchart illustrating the flow of a process performed by a game system.

FIG. 12 is a flowchart illustrating the flow of the process that is performed by the game system 1000. The process illustrated in FIG. 12 is implemented by executing the game calculation program 502.

The game device main body 1002 included in the game system 1000 performs a device authentication process on the touch panel 1004, the range sensor unit 1100, the game controller 1200, and the headset 1300 (step S2).

After completion of the device authentication process, the range sensor unit 1100 sequentially outputs an image (image data) captured by the color image sensor 1104 in a given cycle, and the ranging results based on the captured image, to the game device main body 1002. The game controller 1200 outputs the detection results of the 6-axis sensor 1208 to the game device main body 1002 in a given cycle, and the headset 1300 outputs the detection results of the 6-axis sensor 1308 included in the HMD 1310 to the game device main body 1002 in a given cycle.

The game device main body 1002 then performs a process that calculates the position Ph of the HMD 1310, the position Pc of the game controller 1200, and the left hand position Pl and the right hand position Pr of the player 2 in a given cycle based on the image and the ranging results input from the range sensor unit 1100 (step S4). Specifically, the game device main body 1002 then starts a process that tracks each element within the real space.

The game device main body 1002 performs a process that determines whether or not the player 2 holds the game controller 1200 in a given cycle (step S6), and performs a process that determines whether or not a gesture input has been performed (step S8).

The game device main body 1002 displays a start screen on the touch panel 1004, and waits for the player 2 to perform a game start operation input. When a given game start operation has been input using the game controller 1200 (step S10), the game device main body 1002 displays a guide (guide display) that prompts the player 2 to wear the headset 1300 on the touch panel 1004 (step S12). The game device main body 1002 performs a process that determines whether or not the player 2 desires to play the game (step S14). The game device main body 1002 performs a control process that disposes the virtual stereo camera 10 at the initial position within the virtual space, and displays a stereoscopic image based on the state of the virtual space captured by the virtual stereo camera 10 on the HMD 1310 (step S15), and performs a player assistance process (step S16).

Figure 13:
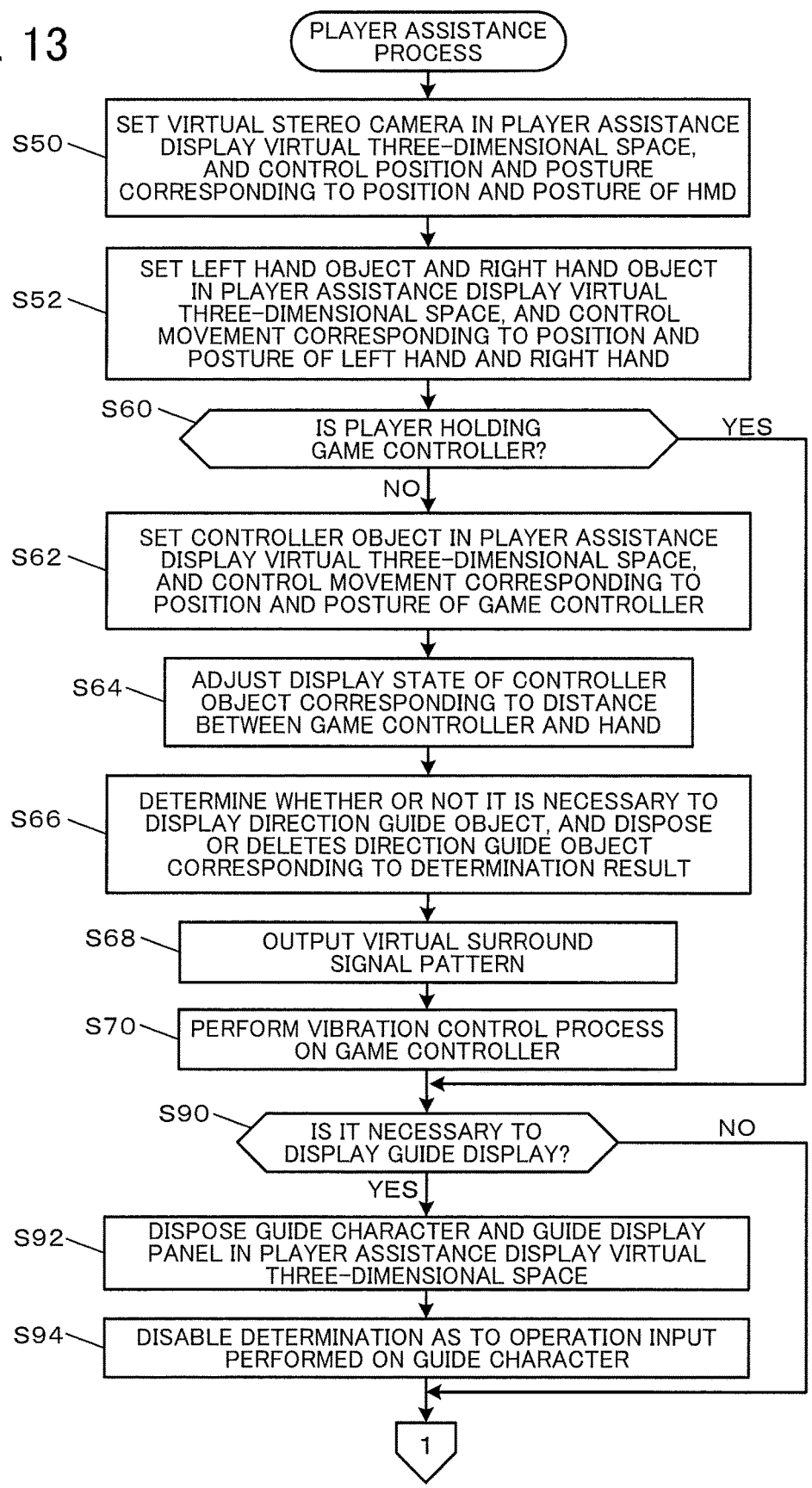
FIG. 13 is a flowchart illustrating the flow of a player assistance process.
Figure 14:
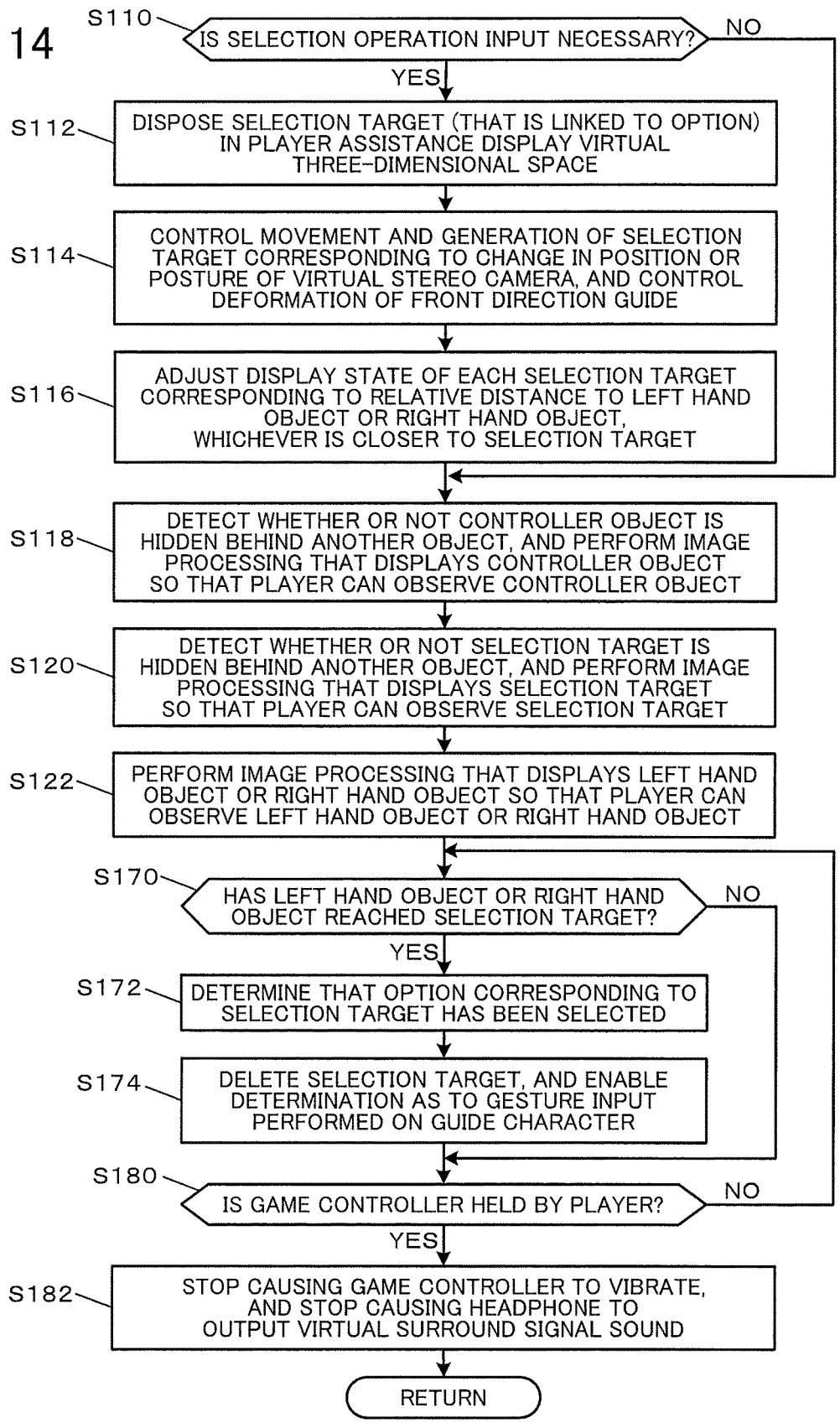
FIG. 14 is a flowchart that follows the flowchart illustrated in FIG. 13.

FIGS. 13 and 14 are flowcharts illustrating the flow of the player assistance process.

As illustrated in FIG. 13, the game device main body 1002 generates the virtual space control data 630 (see FIG. 11), and controls the position (movement) and the posture of the virtual stereo camera 10 in the virtual space in synchronization with the position and the posture of the HMD 1310 in the real space (step S50).

The game device main body 1002 disposes the left hand object 14 and the right hand object 16 (see FIG. 5) in the virtual space, and controls the movement (position) and the posture of the left hand object 14 and the right hand object 16 in the virtual space in synchronization with the position and the posture of the left hand and the right hand of the player 2 in the real space (step S52).

When the player 2 does not hold the game controller 1200 (NO in step S60), the game device main body 1002 disposes the controller object 12 (see FIG. 5) in the virtual space, and controls the movement (position) and the posture of the controller object 12 in the virtual space in synchronization with the position and the posture of the game controller 1200 in the real space (step S62).

The game device main body 1002 adjusts the display state of the controller object 12 (step S64).

Specifically, the game device main body 1002 calculates the relative distance between the controller object 12 and the left hand object 14, and the relative distance between the controller object 12 and the right hand object 16, and sets (changes) the display state (e.g., display color, blink pattern, or display size) of the controller object 12 corresponding to the relative distance between the controller object 12 and the left hand object 14, or the relative distance between the controller object 12 and the right hand object 16, whichever is shorter.

The game device main body 1002 determines whether or not it is necessary to display the direction guide object 13, and disposes or deletes the direction guide object 13 corresponding to the determination result (step S66).

Specifically, the game device main body 1002 determines whether or not the controller object 12 is situated within the imaging range of the virtual stereo camera 10. When the controller object 12 is not situated within the imaging range of the virtual stereo camera 10, the game device main body 1002 determines that it is necessary to display the direction guide object 13, and disposes the direction guide object 13 that indicates the controller object 12 in a given area within the imaging range. Specifically, the game device main body 1002 controls the position and the posture of the direction guide object 13 corresponding to the direction or the field of view of the HMD 1310. When the controller object 12 is situated within the imaging range, the game device main body 1002 determines that it is unnecessary to display the direction guide object 13 (i.e., does not dispose the direction guide object 13), and deletes the direction guide object 13 when the direction guide object 13 has been disposed.

The game device main body 1002 changes the display state of the direction guide object 13 corresponding to the distance to the left hand object 14 or the right hand object 16, whichever is closer to the virtual stereo camera 10. For example, the game device main body 1002 changes the display color of the direction guide object 13, or changes the dimensional ratio (e.g., the length of the arrow) of the direction guide object 13. When the direction guide object 13 is an arrow, the number of arrows may be increased as the distance increases, and the arrows may be arranged in series toward the controller object 12.

The game device main body 1002 then outputs a virtual surround signal sound from the headphone 1302 (step S68).

Specifically, the game device main body 1002 calculates the relative direction and the relative distance from the HMD 1310 to the game controller 1200, and performs a virtual surround control process so that the signal sound that is changed in pattern corresponding to the relative distance is output from the headphone 1302 in the relative direction.

The game device main body 1002 then performs a vibration control process on the game controller 1200 (step S70). The vibrational pattern and the vibrational intensity may be set and changed corresponding to the relative distance between the controller object 12 and the left hand object 14 or the right hand object 16.

The game device main body 1002 then determines whether or not it is necessary to display the guide display. Since the game device main body 1002 has started the process that determines whether or not the player 2 desires to play the game (step S14), the game device main body 1002 determines that it is necessary to display the guide display.

When it is necessary to display the guide display (YES in step S90), the game device main body 1002 disposes the guide character 20 and the guide display panel 22 between the virtual stereo camera 10 and the origin of the virtual space on the front side of the virtual stereo camera 10 (i.e., in the depth direction with respect to the virtual stereo camera 10) (step S92) (see FIG. 5). Since the game device main body 1002 has started the process that determines whether or not the player 2 desires to play the game (step S14), a text that prompts the player 2 to perform an operation input for playing the game is displayed in the guide display panel 22 (see FIG. 6A).

The game device main body 1002 disables a determination as to a gesture input performed on the guide character 20 (step S94). This prevents a situation in which a gesture input performed on the selection target 24 is erroneously determined to be a gesture input performed on the guide character 20.

Again referring to FIG. 14, the game device main body 1002 then determines whether or not a selection operation input is necessary. Since the game device main body 1002 has started the process that determines whether or not the player 2 desires to play the game (step S14), the game device main body 1002 determines that a selection operation input is necessary.

When the game device main body 1002 determines that a selection operation input is necessary (YES in step S110), the game device main body 1002 disposes the selection target 24 (that is linked to an option) in the virtual space (step S112). When the selection target 24 is a "balloon", the selection target 24 is disposed so that the indicator of the balloon is situated near the guide character 20, and the main body of the balloon is situated on the side of the guide character 20 (see FIG. 6A).

The game device main body 1002 controls the movement of the selection target 24 corresponding to a change in the position or the posture of the virtual stereo camera 10, and controls deformation of the front direction guide 25 (step S114). Specifically, the game device main body 1002 controls the movement of the selection target 24 so that the selection target 24 is displayed at a given position within the stereoscopic image (game screen), and always faces the virtual stereo camera 10. The game device main body 1002 controls deformation of the front direction guide 25 so that the front direction guide 25 extends from the side of the guide character 20, and is connected to the selection target 24.

Note that the step S114 may be skipped when a change in the position or the posture of the virtual stereo camera 10 satisfies a given condition. For example, the step S114 may be skipped, or the current control state may be maintained, when the front direction of the virtual stereo camera 10 (i.e., the front direction of the HMD 1310) forms an angle of 90° or more with the depth direction (i.e., the front direction of the range sensor unit 1100) in the real space.

The game device main body 1002 then automatically adjusts the display state of each selection target 24 corresponding to the relative distance to the left hand object 14 or the right hand object 16, whichever is closer to the selection target 24 (step S116).

Specifically, when the relative distance between the selection target 24 and the left hand object 14 or the right hand object 16 does not satisfy a given proximity condition whereby it is determined that the selection target 24 has been selected (reached), the game device main body 1002 sets the display state of the selection target 24 to a normal display state. The game device main body 1002 sets the display state of the selection target 24 to a special display state that represents that the selection target 24 has been selected when the proximity condition has been satisfied.

The game device main body 1002 then detects whether or not part or the entirety of the controller object 12 is hidden behind another object when viewed from the virtual stereo camera 10, and performs image processing that displays the controller object 12 so that the player 2 can observe the controller object 12 when part or the entirety of the controller object 12 is hidden behind another object (step S118).

Specifically, the game device main body 1002 displays the object behind which the controller object 12 is hidden in a semi-transparent state, or deletes or deforms part of the model of the object behind which the controller object 12 is hidden, so that the player 2 can observe the controller object 12.

The game device main body 1002 then detects whether or not part or the entirety of the selection target 24 is hidden behind another object when viewed from the virtual stereo camera 10, and performs image processing that displays the selection target 24 so that the player 2 can observe the selection target 24 when part or the entirety of the selection target 24 is hidden behind another object (step S120).

The game device main body 1002 then detects whether or not part or the entirety of the left hand object 14 or the right hand object 16 is hidden behind another object when viewed from the virtual stereo camera 10, and performs image processing that displays the left hand object 14 or the right hand object 16 so that the player 2 can observe the left hand object 14 or the right hand object 16 when part or the entirety of the left hand object 14 or the right hand object 16 is hidden behind another object (step S122).

The game image illustrated in FIG. 6A, 7A, or 8A is thus presented to the player 2.

The game device main body 1002 then determines whether or not a selection input has been performed using a gesture input (step S170). In one embodiment of the invention, it is determined that a selection input has been performed using a gesture input when the left hand object 14 or the right hand object 16 has reached the selection target 24. For example, YES and NO (or options) may respectively be assigned to the left area and the right area of the field of view of the HMD 1310, and whether or not a given motion (e.g., a motion that moves the hand forward, or a motion that waves the hand) has been performed in the left area or the right area of the field of view using the left hand object 14 or the right hand object 16 may be determined, or whether or not given shape (e.g., scissors) has been formed with the hand may be determined.

When it has been detected that a selection input has been performed (YES in step S170), the game device main body 1002 determines that the option corresponding to the selection target 24 for which the selection input has been performed, has been selected (step S172). In this case, the game device main body 1002 changes the display state of the selection target 24 to a given state to notify the player 2 that the option has been selected.

The game device main body 1002 then deletes the selection target 24, and enables a determination as to a gesture input performed on the guide character 20 (step S174). When a plurality of selection targets 24 are displayed, it is preferable to delete the selection target 24 for which it has been determined that the selection input has been performed in the step S170 at a timing later than the other selection targets 24 so that the player can reliably determine the selection target 24 selected by the player. The steps S172 and S174 can be similarly performed even when only one selection target 24 (e.g., the selection target 24 used as an OK button) is displayed.

When it has been detected that the game controller 1200 is held by the player 2 after starting the player assistance process (YES in step S180), the game device main body 1002 stops causing the game controller 1200 to vibrate, and stops causing the headphone 1302 to output the virtual surround sound (step S182), and terminates the player assistance process.

Again referring to FIG. 12, the player 2 wears the headset 1300, and holds the game controller 1200 when the step S16 has been performed. Specifically, the player 2 is ready to play the game.

The game device main body 1002 then starts a game play control process that displays the game screen on the HMD 1310, and outputs the game sound from the headphone 1302 (step S200).

The game device main body 1002 cyclically determines whether or not a player assistance start condition has been satisfied during the game. The player assistance start condition may be appropriately set corresponding to the game. In one embodiment of the invention, it is determined that the player assistance start condition has been satisfied when the player 2 does not hold the game controller 1200, when the player 2 has performed an operation input using a device (e.g., keyboard) other than the game controller 1200, when a gesture input with the hand of the player 2 is required, for example. These conditions may be used in combination.

When the player assistance start condition has been satisfied (YES in step S202), the game device main body 1002 performs the player assistance process (step S204).

The game device main body 1002 performs the player assistance process when the player assistance start condition has been satisfied until the player assistance start condition is not satisfied, or the game status has satisfied a given game end condition after the player assistance process has been performed. When the game end condition has been satisfied (YES in step S210), the game device main body 1002 terminates the process.

The embodiments of the invention thus reduce inconvenience that may occur when the HMD is used for a game device or the like, and improve usability.

Specifically, when it has been detected that the player 2 does not hold the game controller 1200, the HMD 1310 displays a stereoscopic image of the virtual space that is viewed from the viewpoint position of the player subjected to the head-tracking process. The controller object 12 is displayed within the stereoscopic image at the position of the game controller 1200 when viewed from the viewpoint of the user, and the left hand object 14 and the right hand object 16 (that are generated based on the motion trace process) are also displayed within the stereoscopic image. Therefore, even when the player wears the HMD, and cannot observe the state of the external world, the player can move his/her hand to the position of the game controller 1200, and hold the game controller 1200 since the virtual space within the stereoscopic image serves as a virtual reality space. This prevents a situation in which the player must grope for the controller.

When the game controller 1200 is situated outside the field of view of the HMD 1310, the direction guide object 13 presents the direction of the game controller 1200 to the player. Therefore, the player can easily find and hold the game controller 1200 by referring to the direction guide object 13. When the controller object 12 is hidden behind another object, the other object is automatically displayed in a semi-transparent state, or clipped, for example. Therefore, the player can easily find the game controller 1200 by referring to the controller object 12.

The embodiments of the invention can also improve usability when implementing a gesture input using the HMD.

Specifically, the selection target 24 that is linked to each gesture input is displayed at (almost) the same position within the stereoscopic image displayed on the HMD 1310 (that is subjected to the head-tracking process) even when the player has turned his/her head. It may be difficult for an inexperienced player to perform a gesture input in the optimum way. However, since the player (user) can use the selection target as a guide when performing a gesture input, the player (user) can smoothly perform the required gesture input.

It is determined that a gesture input has been performed when the left hand object 14 or the right hand object 16 has reached the selection target 24. Therefore, the player (user) can perform the required gesture input taking account of the relationship between the left hand object 14 or the right hand object 16 and the selection target 24. When the selection target 24 is hidden behind another object, the other object is automatically displayed in a semi-transparent state, or clipped, for example. Therefore, the player can easily observe the selection target 24.

When a gesture input target other than the selection target is present in the virtual space, a gesture input performed on the gesture input target other than the selection target is disabled. This makes it possible to give priority to a gesture input performed on the selection target, and disable an unintended gesture input.

Modifications

The invention is not limited to the above embodiments. Various modifications may be made of the above embodiments, such as appropriately adding other elements, omitting some of the elements, or changing some of the elements.
(1) The above embodiments have been described taking an example in which the HMD is a non-see-through HMD. Note that the HMD need not necessarily be a non-see-through HMD depending on the game. For example, the invention can also be applied to a semi-see-through HMD. In this case, the above advantageous effects can also be achieved.

(2) The headset 1300 may be an eyeglass-type or goggle-type wearable computer that includes a posture detection sensor, and function as the game device main body 1002, for example. The game system 1000 according to the above embodiments is not limited to a consumer stationary game device as long as the game system 1000 is a computer provided with an HMD. The above embodiments may also be applied to an attraction device that utilizes an HMD and is installed in an amusement park, a museum, or the like, an airplane/helicopter simulation device that utilizes an HMD, a sport simulation device that allows the user who wears an HMD to virtually experience a sport (e.g., swing a golf club in a studio), and the like.

(3) The above embodiments have been described taking the stand-alone game system 1000 as an example. Note that the game system 1000 may be the client-server game system illustrated in FIG. 15. In this case, the game calculation section 202 (see FIG. 9) is implemented by a server system 1900 connected through a communication channel 9. The game device main body 1002 executes a given client program to implement a function of sequentially transmitting the input signal from the operation input section 100 to the server system 1900, a function of displaying an image on the HMD 1310 based on data received from the server system 1900, and a function of outputting sound from the headphone 1302. Specifically, the game device main body 1002 has the control functions required for a user terminal (i.e., functions as a user terminal).

(4) The above embodiments have been described taking an example in which the posture of the HMD 1310 is detected using the image captured by the range sensor unit 1100 and the detection results of the 6-axis sensor 1308 included in the HMD 1310. Note that the configuration is not limited thereto.

Figure 15:
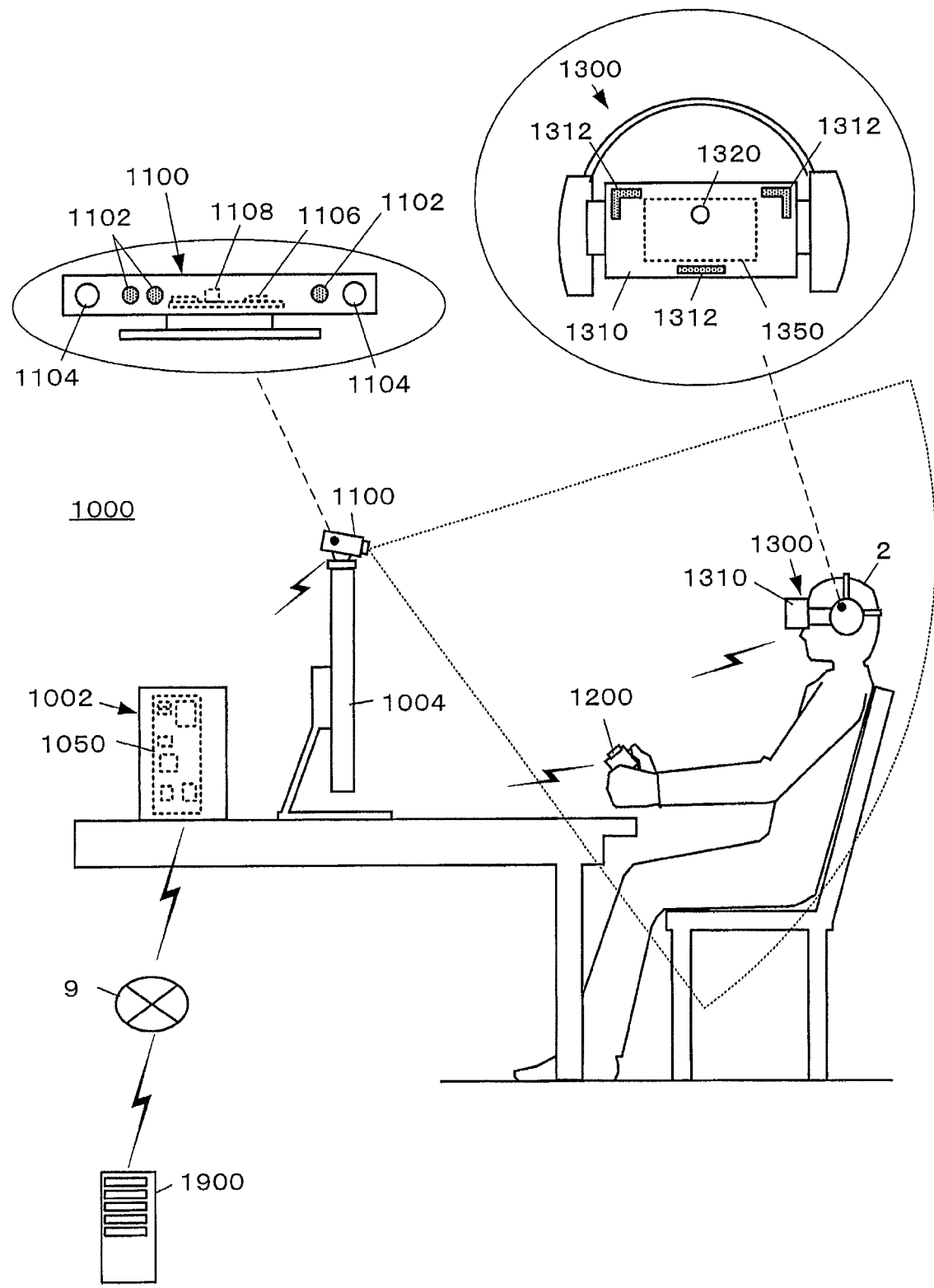
FIG. 15 is a view illustrating a modification of the configuration of a game system.

In FIG. 15, an image sensor 1320 (infrared image sensor) that captures the external world in front of the HMD 1310 is added as a posture detection sensor, a plurality of infrared irradiators 1102 are provided to the range sensor unit 1100 so as to have a given positional relationship. The controller position-posture calculation section 212 is used as a controller capture detection means. Specifically, the infrared irradiator 1102 is considered to be a stationary marker that is provided at a given position in the real space. When the infrared irradiator 1102 is captured within the image captured by the range sensor unit 1100, it is determined that game controller 1200 is captured, and the position (including the distance) of the infrared irradiator 1102 is calculated from the captured image. The position Ph and the posture of the HMD 1310 with respect to the position of the image sensor 1320 are geometrically calculated from the rotation and the deformation of the positional relationship between the infrared irradiators 1102, the distance between the infrared irradiators 1102, the size of the infrared irradiator 1102 captured within the captured image, and the like. The controller object control section 222 of the player assistance control section 220 disposes the controller object 12 in the virtual space corresponding to the detection results of the controller capture detection section 208, and performs a given notification control process. In this case, the controller object control section 222 functions as a capture notification control section. The notification may be implemented using an appropriate method (e.g., display, sound output, or vibration).

(5) The above embodiments have been described taking an example in which the position Pc of the game controller 1200 is represented by the coordinates of the coordinate system of the ranging space (see FIG. 4). Note that the configuration is not limited thereto.

For example, the position Pc of the game controller 1200 may be represented by the relative position based on the position Ph and the posture of the HMD 1310 (i.e., the viewpoint and the line-of-sight direction of the player 2 who wears the HMD 1310) in the recognition space. This modification may be appropriately applied to the above embodiments.

(6) The above embodiments have been described taking an example in which the selection target 24 is disposed in a given area within the field of view of the HMD 1310 so that the selection target 24 faces the virtual stereo camera 10, and the movement and the posture of the selection target 24 are controlled corresponding to the position and the posture of the HMD 1310. Note that the selection target 24 may be disposed at a given position within the virtual space to have a given posture (in the same manner as the guide display panel 22) independently of a change in the position and the posture of the HMD 1310. The above embodiments are suitable for a game (e.g., first person shooter (FPS)) in which the player may lose sight of the selection target 24 due to a large head movement. On the other hand, it is preferable that the selection target 24 be fixed at a given position within the virtual space, and appears within the field of view only when the HMD 1310 faces the given position when implementing an adventure game in which the player inputs a number or an operation for unlocking a secret room, for example.

Note that both methods may be used in combination. In this case, data that defines a selection input event may be stored in the storage section 500 (see FIG. 9), and information about the selection input and information that represents whether or not to fix the position of each selection target 24 may be linked to each selection target 24. The selection target control section 228 (see FIG. 9) may control the position and the posture (direction) of the selection target 24 according to the stored data.

(7) The above embodiments have been described taking an example in which the hand of the player 2 is used as the gesture input operation indicator. Note that a pointing device may be used depending on the game. A known gun-type controller, a known stick motion controller, or the like may be used as the pointing device. In this case, it is preferable to provide a marker that corresponds to the light-emitting marker 1312 (see FIG. 3A) to the front end of the gun-type controller or the stick motion controller, capture the marker using the range sensor unit 1100 to detect the position of the front end of the gun-type controller or the stick motion controller, and detect a change in posture using a 6-axis sensor. In such a case, the pointing device may be used as the game controller 1200.

(8) The above embodiments have been described taking an example in which a stereoscopic image is displayed on the HMD 1310. Note that a two-dimensional image may be displayed on the HMD 1310. In this case, one virtual camera may be provided between the right virtual camera and the left virtual camera included in the virtual stereo camera 10, and may be used instead of the virtual stereo camera 10. Alternatively, only one of the right virtual camera and the left virtual camera may be used.

(9) The above embodiments have been described taking an example in which the origin of the coordinate system (see FIG. 5) in the virtual space corresponds to the origin of the coordinate system of the ranging space (real space) (see FIG. 4). Note that the configuration is not limited thereto.

Figure 16:
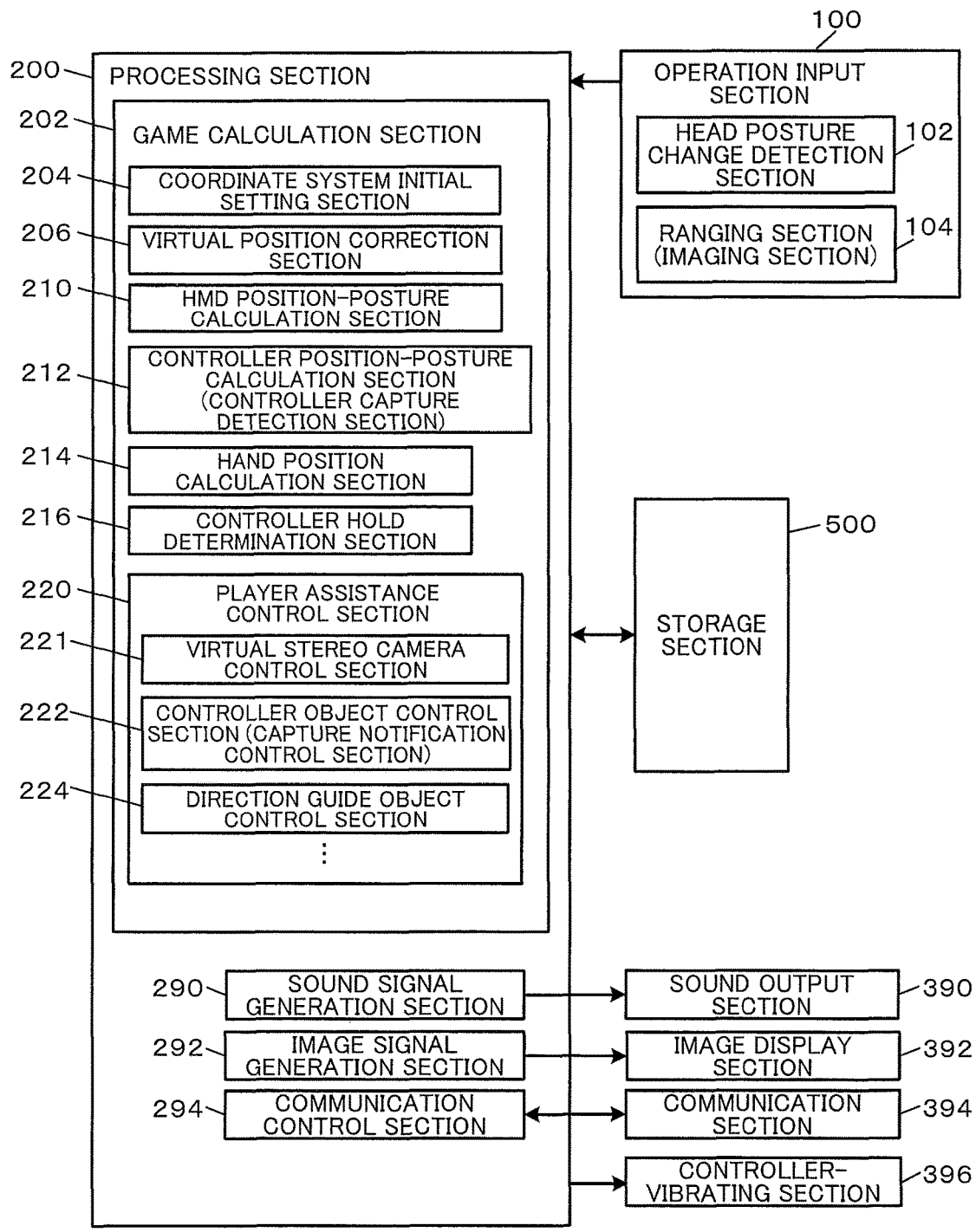
FIG. 16 is a view illustrating a modification of a functional configuration.

For example, the game calculation section 202 may include a coordinate system initial setting section 204 that initializes the coordinate system of the virtual space so as to correspond to the real space (see FIG. 16). The coordinate system initial setting section 204 sets the position Ph of the HMD 1310 based on the ranging results of the range sensor unit 1100 at the tracking start timing to be the origin of the virtual space, adjusts the coordinate axes corresponding to the posture of the HMD 1310 at the tracking start timing, and performs a matching process on the coordinate system of the real space and the coordinate system of the virtual space (initialization).

Figure 17:
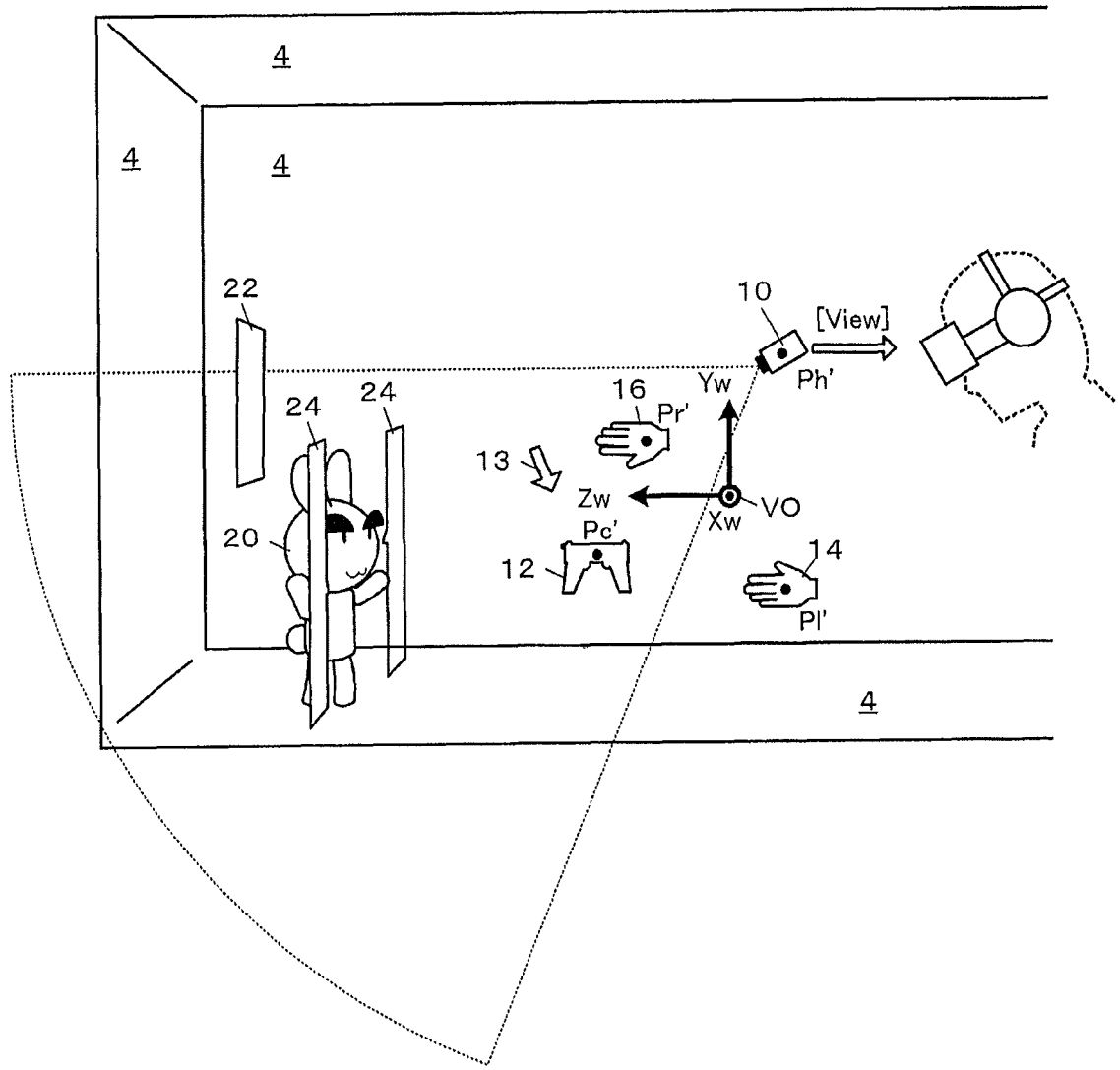
FIG. 17 is a view illustrating a modification of a virtual space for generating a stereoscopic image (game image) that is displayed on an HMD, and an object that is disposed in the virtual space.

As illustrated in FIG. 17, an intermediate point between the left hand position Pl and the right hand position Pr based on the ranging results of the range sensor unit 1100 at the tracking start timing may be used as the origin VO of the virtual space, and the coordinate axes may be adjusted corresponding to the posture of the HMD 1310 at the tracking start timing.

When the coordinate system of the real space and the coordinate system of the virtual space have a reverse relationship, a coordinate transformation process is appropriately performed when reflecting the ranging results in the object within the virtual space (e.g., when performing a motion trace process on the left hand object 14 based on the left hand position Pl).

(10) The scale of the tracking process and the motion trace process may be corrected based on the relative positional relationship between the position Ph of the HMD 1310 in the real space and the operation indicator (left hand position Pl or right hand position Pr).

In this case, a virtual position correction section 206 is provided (see FIG. 16). When the relative positional relationship with respect to the direction of the HMD 1310 has satisfied a given correction condition, the virtual position correction section 206 corrects the virtual position according to correction calculations linked to the correction condition.

More specifically, when the front direction of the HMD 1310 forms an angle of 90° or more with the front direction (i.e., the depth direction in the real space) of the range sensor unit 1100 in the lateral direction, the scale of the motion trace process on the left hand position Pl may be increased by a given factor when the angle is 90° or more in the leftward direction, and the scale of the motion trace process on the right hand position Pr may be increased by a given factor when the angle is 90° or more in the rightward direction.

Although only some embodiments of the invention have been described in detail above, those skilled in the art will readily appreciate that many modifications are possible in the embodiments without materially departing from the novel teachings and advantages of the invention. Accordingly, all such modifications are intended to be included within scope of the invention.

What is claimed is:

1. A method that causes a computer to control a display on a head-mounted display (HMD) that is worn on a head of a user, the method comprising:
   causing the computer to receive data that represents a captured image from an imaging section, the imaging section being provided so as to capture a real space that includes the HMD, and a controller that is held and operated by the user, the captured image including the HMD and the controller;
   causing the computer to calculate a virtual position of the controller within a virtual space using the captured image, the virtual space being a display image space of the HMD;

causing the computer to calculate a virtual position of the HMD within the virtual space using the captured image;
causing the computer to display a first guide display on the HMD so that the first guide display indicates the virtual position of the controller viewed from the virtual position of the HMD;
causing the computer to determine a position and/or a posture of the HMD in the real space;
causing the computer to generate an image of the virtual space that is displayed on the HMD, the image of the virtual space that is displayed on the HMD changing in field of view corresponding to the determined position and/or the determined posture of the HMD in the real space;
causing the computer to change a state of the first guide display corresponding to whether or not the virtual position of the controller is within the field of view; and
causing the computer to display an object that represents a direction from the virtual position of the HMD toward the virtual position of the controller as the first guide display when the virtual position of the controller is outside of the field of view, wherein the first guide display indicates a position within the virtual space that corresponds to a position of the controller within the real space.

2. The method as defined in claim 1, wherein
a marker is provided to the HMD, and
the method further comprises: causing the computer to determine the position and/or the posture of the HMD using imaging information about the marker within the captured image.

3. The method as defined in claim 1, wherein
the HMD includes a posture detection sensor that includes at least one of an acceleration sensor, a gyro sensor, and a camera for capturing a stationary marker that is provided at a given position within the real space, and
the method further comprises: causing the computer to determine the position and/or the posture of the HMD using detection results of the posture detection sensor.

4. The method as defined in claim 1, further comprising: causing the computer to perform image processing that displays the first guide display when the first guide display is situated at a hidden position within the virtual space when viewed from the virtual position of the HMD.

5. The method as defined in claim 1, further comprising: causing the computer to display an object that represents the controller as the first guide display when the virtual position of the controller is within the field of view.

6. The method as defined in claim 1, further comprising: causing the computer to calculate a virtual position of a hand of the user within the virtual space that corresponds to a position of the hand of the user within the real space using the captured image; and
causing the computer to display a second guide display on the HMD using the virtual position of the hand of the user, the second guide display indicating a position within the virtual space that corresponds to the position of the hand of the user within the real space.

7. The method as defined in claim 1, further comprising: causing the computer to calculate a virtual position of a hand of the user within the virtual space that corresponds to a position of the hand of the user within the real space using the captured image; and causing the computer to change the first guide display using a relative positional relationship between the virtual position of the controller and the virtual position of the hand.

8. The method as defined in claim 1, further comprising: causing the computer to output a guide sound from a headphone that is worn by the user, the guide sound representing the virtual position of the controller.

9. The method as defined in claim 1, further comprising: causing the computer to initialize a coordinate system of the virtual space so as to correspond to the real space.

10. The method as defined in claim 1, wherein
a camera is provided to the HMD, and
the method further comprises:
causing the computer to detect whether or not the controller is captured within an image captured by the camera; and
causing the computer to perform a given notification control process corresponding to a detection result as to whether or not the controller is captured within the image captured by the camera.

11. A method that causes a computer to control a display on a head-mounted display (HMD) that is worn on a head of a user, the method comprising:
causing the computer to receive data that represents a captured image from an imaging section, the imaging section being provided so as to capture a real space that includes the HMD, and a controller that is held and operated by the user, the captured image including the HMD and the controller;
causing the computer to calculate a virtual position of the controller within a virtual space using the captured image, the virtual space being a display image space of the HMD;
causing the computer to detect whether or not the controller is held; and
causing the computer to display a first guide display on the HMD using the virtual position of the controller, when the controller is not held, the first guide display indicating a position within the virtual space that corresponds to a position of the controller within the real space.

12. An image generation device that generates an image that is displayed on a head-mounted display (HMD) that is worn on a head of a user, the image generation device comprising:
a captured image-receiving section that receives data that represents a captured image from an imaging section, the imaging section being provided so as to capture a real space that includes the HMD, and a controller that is held and operated by the user, the captured image including the HMD and the controller;
a controller position calculation section that calculates a virtual position of the controller within a virtual space using the captured image, the virtual space being a display image space of the HMD;
an HMD position-posture calculation section that calculates a virtual position of the HMD within the virtual space using the captured image, and determines a position and/or a posture of the HMD in the real space; and
a display control section that: (i) generates an image of the virtual space that is displayed on the HMD, the image of the virtual space that is displayed on the HMD changing in field of view corresponding to the determined position and/or the determined posture of the HMD in the real space, and (ii) displays a first guide display on the HMD so that the first guide display indicates the virtual position of the controller viewed from the virtual position of the HMD, wherein the display control section:
changes a state of the first guide display corresponding to whether or not the virtual position of the controller is within the field of view,
displays an object that represents a direction from the virtual position of the HMD toward the virtual position of the controller as the first guide display when the virtual position of the controller is outside of the field of view, and
displays the first guide display to indicate a position within the virtual space that corresponds to a position of the controller within the real space.

13. An image generation device that generates an image that is displayed on a head-mounted display (HMD) that is worn on a head of a user, the image generation device comprising:

a captured image-receiving section that receives data that represents a captured image from an imaging section, the imaging section being provided so as to capture a real space that includes the HMD, and a controller that is held and operated by the user, the captured image including the HMD and the controller;
a controller position calculation section that calculates a virtual position of the controller within a virtual space using the captured image, the virtual space being a display image space of the HMD;
a controller hold determination section that detects whether or not the controller is held; and
a first guide display control section that displays a first guide display on the HMD using the virtual position of the controller, when the controller is not held, the first guide display indicating a position within the virtual space that corresponds to a position of the controller within the real space.

* * * * *